United States Patent
Flynn et al.

(10) Patent No.: US 12,319,790 B2
(45) Date of Patent: Jun. 3, 2025

(54) METHODS AND SYSTEMS FOR PROCESSING MIXED TEXTILE FEEDSTOCK, ISOLATING CONSTITUENT MOLECULES, AND REGENERATING CELLULOSIC AND POLYESTER FIBERS

(71) Applicant: EVRNU, SPC, Seattle, WA (US)

(72) Inventors: Stacy Flynn, Seattle, WA (US); Christopher Stanev, Rutherford, NJ (US)

(73) Assignee: EVRNU, SPC, Seattle, WA (US)

( * ) Notice: Subject to any disclaimer, the term of this patent is extended or adjusted under 35 U.S.C. 154(b) by 416 days.

(21) Appl. No.: 17/344,646

(22) Filed: Jun. 10, 2021

(65) Prior Publication Data

US 2021/0340350 A1 Nov. 4, 2021

Related U.S. Application Data

(60) Division of application No. 15/747,736, filed as application No. PCT/US2016/044325 on Jul. 27, (Continued)

(51) Int. Cl.
*C08J 11/10* (2006.01)
*C08J 11/08* (2006.01)
(Continued)

(52) U.S. Cl.
CPC ............ *C08J 11/10* (2013.01); *C08J 11/08* (2013.01); *C08J 11/16* (2013.01); *C08J 11/18* (2013.01);
(Continued)

(58) Field of Classification Search
CPC . C08J 11/10; C08J 11/08; D01F 11/02; D01F 11/08
See application file for complete search history.

(56) References Cited

U.S. PATENT DOCUMENTS

| 2,039,307 A | 5/1936 | Dreyfus |
| 2,047,136 A | 7/1936 | Doyle |

(Continued)

FOREIGN PATENT DOCUMENTS

| CN | 103060844 | 4/2013 |
| CN | 112709092 | 6/2022 |

(Continued)

OTHER PUBLICATIONS

Hsieh, Y.L., "Chemical structure and properties of cotton" Cotton: Science and technology, (2007) 3-34.

(Continued)

*Primary Examiner* — Larry W Thrower
(74) *Attorney, Agent, or Firm* — Summit Patents, PC

(57) ABSTRACT

Methods and systems of the present invention use mixed textile feedstock, which may include post-consumer waste garments, scrap fabric and/or other textile materials as a raw feed material to produce isolated cellulose and other isolated molecules having desirable properties that can be used and be used in the textile and apparel industries, and in other industries. A multi-stage process is provided, in which mixed textile feed material is subjected to one or more pretreatment stages, followed by at least two pulping treatments for isolating cellulose molecules and other molecular constituents, such as polyester. The isolated cellulose and polyester molecules may be used in a variety of downstream applications. In one application, isolated cellulose and polyester molecules are extruded to provide regenerated cellulose fibers and regenerated polyester fibers having desirable (and selectable) properties that are usable in various industrial applications, including textile production.

17 Claims, 11 Drawing Sheets

Related U.S. Application Data 2016, now Pat. No. 11,034,817, and a continuation-in-part of application No. 14/811,723, filed on Jul. 28, 2015, now abandoned, which is a continuation-in-part of application No. 14/255,886, filed on Apr. 17, 2014, now abandoned.

(60) Provisional application No. 62/214,708, filed on Sep. 4, 2015, provisional application No. 62/198,077, filed on Jul. 28, 2015, provisional application No. 61/812,931, filed on Apr. 17, 2013.

(51) Int. Cl.

| | | |
|---|---|---|
| C08J 11/16 | (2006.01) | |
| C08J 11/18 | (2006.01) | |
| D01F 11/02 | (2006.01) | |
| D01F 11/08 | (2006.01) | |
| D21B 1/02 | (2006.01) | |
| D21C 1/02 | (2006.01) | |
| D21C 3/20 | (2006.01) | |
| D21C 3/22 | (2006.01) | |
| D21C 5/00 | (2006.01) | |
| D21C 9/00 | (2006.01) | |
| D21C 9/10 | (2006.01) | |
| B29C 48/285 | (2019.01) | |
| D01F 2/00 | (2006.01) | |
| D01F 2/04 | (2006.01) | |
| D01F 6/62 | (2006.01) | |

(52) U.S. Cl.
CPC .............. *D01F 11/02* (2013.01); *D01F 11/08* (2013.01); *D21B 1/02* (2013.01); *D21C 1/02* (2013.01); *D21C 3/20* (2013.01); *D21C 3/22* (2013.01); *D21C 5/005* (2013.01); *D21C 9/001* (2013.01); *D21C 9/10* (2013.01); *B29C 48/2886* (2019.02); *B29C 2948/92171* (2019.02); *C08J 2301/00* (2013.01); *D01F 2/00* (2013.01); *D01F 2/04* (2013.01); *D01F 6/62* (2013.01)

(56) References Cited

U.S. PATENT DOCUMENTS

| | | | |
|---|---|---|---|
| 2,064,473 | A | 12/1936 | Holdsworth |
| 2,100,830 | A | 11/1937 | Altheide |
| 2,307,863 | A | 1/1943 | Soukup |
| 2,337,458 | A | 12/1943 | Edson |
| 3,057,772 | A | 10/1962 | Magill, Jr. |
| 3,320,066 | A | 5/1967 | Garth |
| 3,344,016 | A | 9/1967 | Moggio et al. |
| 3,895,089 | A | 7/1975 | Goyal |
| 4,012,281 | A | 3/1977 | Mayer et al. |
| 4,018,646 | A | 4/1977 | Ruffo et al. |
| 4,081,582 | A | 3/1978 | Butterworth et al. |
| 4,409,384 | A | 10/1983 | Lindsey |
| 4,426,516 | A | 1/1984 | Kuriki et al. |
| 4,634,470 | A | 1/1987 | Kamide et al. |
| 4,963,230 | A | 10/1990 | Kawase et al. |
| 5,009,747 | A | 4/1991 | Viazmensky et al. |
| 5,106,457 | A | 4/1992 | Manning |
| 5,208,004 | A | 5/1993 | Myerson et al. |
| 5,238,534 | A | 8/1993 | Manning et al. |
| 5,281,269 | A * | 1/1994 | Ganci ................ C09B 67/0014 546/49 |
| 5,342,854 | A | 8/1994 | Serad |
| 5,415,738 | A | 5/1995 | Mehta et al. |
| 5,601,767 | A | 2/1997 | Firgo |
| 5,609,676 | A | 3/1997 | von der Eltz |
| 5,853,493 | A | 12/1998 | Skelton et al. |
| 5,868,985 | A | 2/1999 | Frischmann |
| 5,980,746 | A | 11/1999 | Gelman et al. |
| 6,010,542 | A | 1/2000 | DeYoung et al. |
| 6,210,801 | B1 | 4/2001 | Luo |
| 6,214,976 | B1 | 4/2001 | Watanabe et al. |
| 6,235,392 | B1 | 5/2001 | Luo et al. |
| 6,302,997 | B1 | 10/2001 | Hurter |
| 6,344,077 | B1 | 2/2002 | Hong |
| 6,607,637 | B1 | 8/2003 | Vinson et al. |
| 6,861,380 | B2 | 3/2005 | Garnier et al. |
| 7,828,936 | B2 | 11/2010 | Luo et al. |
| 7,981,337 | B2 | 7/2011 | Zhang et al. |
| 8,361,278 | B2 | 1/2013 | Fike et al. |
| 8,454,799 | B2 | 6/2013 | Jehn-Rendu et al. |
| 8,827,192 | B2 | 9/2014 | Innerlohinger et al. |
| 8,962,821 | B2 | 2/2015 | Zhang et al. |
| 9,121,137 | B2 | 9/2015 | Mazmensky et al. |
| 9,145,645 | B2 | 9/2015 | Reed et al. |
| 9,315,840 | B2 | 4/2016 | Genta |
| 9,611,371 | B2 | 4/2017 | Walker |
| 10,065,379 | B2 | 9/2018 | Fretz |
| 10,704,199 | B2 | 7/2020 | Henaff et al. |
| 11,034,817 | B2 | 6/2021 | Flynn et al. |
| 11,441,267 | B2 | 9/2022 | Mitchell et al. |
| 2003/0056916 | A1 | 3/2003 | Horenziak et al. |
| 2004/0126555 | A1 | 7/2004 | Hartmann |
| 2005/0234229 | A1 | 10/2005 | Loth et al. |
| 2006/0213839 | A1 | 9/2006 | Huang et al. |
| 2008/0135193 | A1 | 6/2008 | Kokko |
| 2008/0275231 | A1 | 11/2008 | Zhang et al. |
| 2010/0162542 | A1 | 7/2010 | Luo et al. |
| 2010/0200184 | A1 | 8/2010 | Levit et al. |
| 2010/0298555 | A1 | 11/2010 | Okutsu |
| 2011/0094691 | A1 | 4/2011 | Nunn |
| 2011/0201096 | A1 * | 8/2011 | Streffer ................ D21H 17/06 435/290.1 |
| 2012/0000621 | A1 * | 1/2012 | Stigsson ................ C08H 8/00 162/158 |
| 2012/0028116 | A1 | 2/2012 | Choi et al. |
| 2012/0241669 | A1 | 9/2012 | Jiang et al. |
| 2013/0189474 | A1 | 7/2013 | Kroner et al. |
| 2014/0205830 | A1 | 7/2014 | Malinowsky et al. |
| 2014/0308862 | A1 | 10/2014 | Heinzman et al. |
| 2014/0315461 | A1 | 10/2014 | Schachtner et al. |
| 2014/0318415 | A1 | 10/2014 | Innerlohinger et al. |
| 2014/0343270 | A1 | 11/2014 | Lindström et al. |
| 2014/0364538 | A1 | 12/2014 | Baney et al. |
| 2015/0007952 | A1 | 1/2015 | Möderl et al. |
| 2015/0159302 | A1 | 6/2015 | Leitner et al. |
| 2015/0330029 | A1 | 11/2015 | Ramaratnam et al. |
| 2016/0040360 | A1 | 2/2016 | Li et al. |
| 2016/0362841 | A1 | 12/2016 | Fretz |
| 2016/0369456 | A1 | 12/2016 | Flynn et al. |
| 2017/0152633 | A1 | 6/2017 | Hagihara et al. |
| 2017/0218162 | A1 | 8/2017 | Walker |
| 2017/0282523 | A1 | 10/2017 | Cabell et al. |
| 2017/0328012 | A1 | 11/2017 | Lee et al. |
| 2018/0051416 | A1 | 2/2018 | Lu et al. |
| 2018/0018377 | A1 | 7/2018 | Ziegenbein |
| 2018/0266054 | A1 | 9/2018 | Henaff et al. |
| 2018/0274174 | A1 | 9/2018 | Tanaka et al. |
| 2018/0347110 | A1 | 12/2018 | Hart et al. |
| 2019/0257032 | A1 | 8/2019 | Kawahara et al. |
| 2021/0054567 | A1 | 2/2021 | Flynn et al. |
| 2021/0246581 | A1 | 8/2021 | Flynn et al. |
| 2021/0340350 | A1 | 11/2021 | Flynn et al. |
| 2021/0381166 | A1 | 12/2021 | Flynn et al. |
| 2022/0325479 | A1 | 10/2022 | Shi et al. |

FOREIGN PATENT DOCUMENTS

| | | |
|---|---|---|
| EP | 0743393 | 5/1996 |
| FI | 92133 B | 6/1994 |
| GB | 1473882 | 5/1977 |
| JP | 2000192393 | 7/2000 |
| JP | 2002105894 | 4/2002 |
| TW | 201529648 | 8/2015 |
| WO | 9720102 | 6/1997 |
| WO | 0186042 | 11/2001 |
| WO | 0196402 | 12/2001 |
| WO | 2001096402 | 12/2001 |

(56) References Cited

FOREIGN PATENT DOCUMENTS

| WO | 2011077446 | 6/2011 |
|---|---|---|
| WO | 2012156441 | 11/2012 |
| WO | 2013124265 | 8/2013 |
| WO | 2013145236 | 10/2013 |
| WO | 2014045062 | 3/2014 |
| WO | 2014060651 | 4/2014 |
| WO | WO2014081291 | 5/2014 |
| WO | 2014149024 | 9/2014 |
| WO | 2014162062 | 10/2014 |
| WO | 2015018464 | 2/2015 |
| WO | 2016012755 | 1/2016 |
| WO | 2016110836 | 7/2016 |
| WO | 2017135816 | 8/2017 |

OTHER PUBLICATIONS

Communication pursuant to Article 94(3) EPC mailed May 31, 2022, EP Application No. 16831317.9.
Negulesca et al., "Recycling Cotton from Cotoon/Polyester Fabrics", Textile Chemist and Colorist, Jun. 1998, pp. 31-35.
Anderson, Kim Ph.D., "Dyeing Textiles with Supercritical Carbon Dioxide: A Non-Aqueous Dyeing System", www.techexchange.com, p. 14, Jan. 2009.
(Anonymous), "Synthesis of Schweizer's Reagent then Precipitation of Rayon by Acidification by Disulfideprotein", D Science Madness Discussion Board, Special Topics, Prepublication, www.sciencemadness.org (Jul. 3, 2012).
Hou, Aigin et al., "Using supercritical carbon dioxide as solvent to replace water in polyethylene terephthalate (PET) fabric dyeing procedures", National Engineering Research Center for Dyeing and Finishing of Textiles, Donghua University, Shanghai 201620, China (Jul. 2010). Abstract.
Pacific Northwest Pollution Prevention Resource Center, "Supercritical Carbon-Dioxide Cleaning Technology Review," http://www.pprc.org/pubs/techreviews/co2/co2intro.html, pp. 1-2 (Jul. 1996).
Schamotia, Justin "Cotton Recycling Process", eHow.com, http://www.ehow.com/prinUinfo_8685561_cotton-recycling-process.html.
Van Roosmalen, M.J.E. et al., "Dry-cleaning with high-pressure carbon dioxide—the influence of mechanical action on washing results", Journal of Supercritical Fluids, vol. 27, No. 97, p. 108 (Sep. 2002). Abstract.
Dadi, AP et al., "Enhancement of Cellulose Saccharification Kinetics Using an Ionic Liquid Pretreatment Step, Biotechnology and Bioengineering", Aug. 17, 2006, p. 905, col. 2, paragraph 1 to p. 906, col. 1, paragrah 3.
Wang, "Cellulose Fiber Dissolution in Sodium Hydroxide Solution at Low Temperature: Dissolution Kinetics and Solubility Improvement", Georgia Institute of Technology, Dec. 2008.
Wahlstrom, "Enzymatic Hydrolysis of Cellulose in Aqueous Ionic Liquids", VTT Technical Research Centre of Finland, Feb. 21, 2014.
Okimori et al., "Potential of Carbon Sequestration by Carbonizing Wood Residue from Industrial Tree Plantation as a Clean Development Mechanism Project in the Kyoto Mechanism", Energy with Agricultural Carbon Utilization Symposium, Georgia.
Peterson, "Towards Recycling of Textile Fibers", Chalmers University of Technology, 2015.
De Silva et al., "The Separation & Utilization of Polyester/Cotton Blends", 17th Australian Cotton Conference.
Akato, "Pretreatment and Pyrolysis of Rayon-based Precursor for Carbon Fibers", University of Tennessee, Knoxville, 2012.
Li et al., "A Mechanism Study on Preparation of rayon Based Carbon Fibers with $(NH_4)_2SO_4/NH_3Cl$/organosilicon Composite Catalyst System", Composites Science and Technology, 2007.
Ma et al., "Mechanical, Microstructure and Surface Characterizations of Carbon Fibers Prepared from Cellulose after Liquefying and Curing", Tianjin University of Science and Technology, Dec. 20, 2013.
Park et al., "Precursors and Manufacturing of Carbon Fibers", Carbon Fibers, 2015.
Bhat et al., "Recent Developments on Carbon Fibers from Rayon-Based Precursors", The University of Tennessee, Knoxville.
Holding, "Ionic Liquids and Electrolytes for Cellulose Dissolution", University of Helsinki, 2016.
Seger et al., "Solution behaviour of cellulose and amylose in iron-sodiumtartrate (FeTNa)", Carbohydrate polymers, 31 (1996) 105-112.
Saxena et al., "Viscometric Determination of molecular weight of cellulose pulps in zinc ethylenediamine solution", Journal of Applied Polymer Science, 1963, vol. 7, Issue 1; Abstract.
Shenouda et al., "Swelling of coton in zincoxen", European Polymer Journal, 1975, vol. 12, Issue 5. Abstract.
Harzallah et al, "Physical and Mechanical Properties of Cotton Fibers: Single-fiber Failure", Textile Research Journal, 2009, vol. 80, Issue 11. Abstract.
Landon et al., "Facile Green Synthesis of Large Single Crystal Cooper Micro and Nanoparticles with Ascorbic Acid and Gum Arabic", Open Journal of Applied Sciences, 2013, 3 332-336.
International Search Report and the Written Opinion of the International Searching Authority, Nov. 15, 2016, PCT/US2016/044325.
International Preliminary Report on Patentability, issued Jan. 30, 2018, in International Application No. PCT/US2016-044325, date of filing Jul. 27, 2016.
Beckman, "Supercritical and near-critical CO2 in green chemical synthesis and processing", Journal of Supercritical Fluids, vol. 28, pp. 121-191, 2004.
Shaw et al in "Rayon as Paper-Making Material" Bureau of Standards Journal of Reasearch, vol. 4, pp. 203-211. (Year: 1929).

* cited by examiner

METHODS AND SYSTEMS FOR PROCESSING MIXED TEXTILE FEEDSTOCK, ISOLATING CONSTITUENT MOLECULES, AND REGENERATING CELLULOSIC AND POLYESTER FIBERS

CROSS REFERENCE TO RELATED APPLICATIONS

This application is a divisional of U.S. patent application Ser. No. 15/747,736, filed Jan. 25, 2018, which is a continuation-in-part of U.S. patent application Ser. No. 14/811,723, filed Jul. 28, 2015, which is a continuation-in-part of U.S. patent application Ser. No. 14/255,886, filed Apr. 17, 2014, which claims the benefit of U.S. Patent Application No. 61/812,931, filed Apr. 17, 2013.

U.S. patent application Ser. No. 15/747,736, filed Jan. 25, 2018 is also a US national phase application of PCT International Application No. PCT/US16/44325, filed Jul. 27, 2016, which claims the benefit of U.S. Provisional Patent Application No. 62/198,077, filed Jul. 28, 2015, and U.S. Provisional Patent Application No. 62/214,708, filed Sep. 4, 2015 and U.S. Non Provisional patent application Ser. No. 14/811,723, filed Jul. 28, 2015.

These applications are incorporated herein by reference in their entireties.

FIELD

The present disclosure relates to methods and systems for processing mixed textile feedstock, including textile garments (used and un-used) and scraps comprising cotton, polyester and other materials, biomass comprising cellulosic materials, wood pulp, and the like and for isolating cellulose and other constituent molecules for use in a variety of downstream applications. In particular applications, the present disclosure relates to methods and systems for treatment of mixed textile feedstock (e.g., mixed cotton and polyester textiles) to isolate cellulose and polyester molecules, separately, and to produce regenerated polymers, fibers, and the like from the isolated cellulose and polyester molecules. Recycling and regeneration of textiles is described in detail and provides significant social, environmental and economic benefits.

BACKGROUND

Global sales of apparel are estimated to have exceeded $1 trillion in 2011, and some estimate that over 85% of the garments purchased are discarded in a landfill within one year. This cycle wastes valuable materials and the considerable resources required to produce them, and it exacerbates waste disposal issues.

Cotton clothing is estimated to represent about 35% of the total apparel market. Cotton fibers are composed of cellulose, a naturally occurring polymer found in all plants, wood, and natural fibers. Cotton fibers are harvested from cotton plants and consist of long, interwoven chains of cellulose polymers. These fibers are spun into thread or yarn, dyed, and ultimately woven, knit, and assembled into textiles. Natural fibers, including cotton, have a generally high and variable raw material cost due, in part, to natural disasters and climate unpredictability, regional socio-economic and political instability, human rights issues, and resource requirements.

Growing and harvesting cotton fibers is resource-intensive. It is estimated, for example, that over 700 gallons of water are required to grow enough cotton to produce one pound of fiber. Growing cotton frequently involves heavy pesticide use, significant land resources, and produces significant levels of heat-trapping gases. Considerably more land is required for growing organic cotton than for growing "conventional" cotton. With demand for agricultural land use increasing and fresh water supplies decreasing, the cost of producing natural cotton is increasing. At some point, the current scale of cotton production may become unprofitable and unsustainable.

Cotton has been recycled to provide raw material for paper pulping plants. Re-processing methods that convert used cotton into rags, mattress ticking, seat stuffing, insulating materials, and the like are also available, but these processing methods have been adopted in limited applications because the value of the converted material is relatively low. In contrast to cotton, which is a natural fiber, rayon fibers are manufactured from wood pulp using the viscose process. In this process, purified cellulose is solubilized and then converted or regenerated into cellulose fiber. This process requires steeping, pressing, shredding, aging, xanthanation, dissolving, ripening, filtering, degassing, spinning, drawing and washing. This process is time sensitive, requires multiple chemical treatments, produces lignin and other waste from unusable wood material and is, at best, a semi-continuous manufacturing process.

Most recycled textile resources contain mixed textile compositions and, particularly, many textile feedstocks and resources comprise both cotton and polyester in substantial proportions. The present disclosure is directed to providing systems and methods for processing mixed textile feedstocks, such as recycled fabric, fabric scraps and materials, many of which would otherwise be wasted or used to produce low value products, to isolate their constituent cellulosic and polyester polymeric structures. Implementation of the disclosed processing schemes with a variety of garment/fabric feedstock materials may produce regenerated fibers and textile products having improved and/or customize-able properties using processes having low environmental impacts.

SUMMARY

Methods and systems of the present disclosure relate to processing of mixed textile feedstocks including, for example, postconsumer mixed cellulosic waste, cellulose- and polyester-containing textiles and garments (e.g., recycled or used or waste textiles and garments), and the like, to produce isolated cellulose and/or polyester polymers for use in downstream processing applications. In some embodiments, mixed textile feedstocks comprising discarded garments and/or scrap fabric materials are used as raw feed, and processing produces isolated cellulose and/or polyester polymers that can be further processed and extruded to provide regenerated cellulosic and/or polyester fibers having improved and/or customize-able properties for use in textile industries or for other purposes.

A multi-stage process is described, generally incorporating one or more pretreatment stages providing removal of contaminants and preparation of mixed textile feedstocks, followed by pulping and/or molecular separation of the primary constituents, e.g., cellulose or polyester polymers. Different constituents may be isolated, sequentially, using appropriate pulping and/or molecular separation techniques. In some embodiments, the pretreatment and pulping processes may be carried out in a continuous, semi-continuous or batch system. In some embodiments, the pretreatment and pulping processes may be carried out in one or more closed reaction vessel(s), and processing reagents may be recovered and re-used or processed for other uses.

Numerous pretreatment processing stages are described and may be used alone or in combination to remove non-cellulosic and/or non-polyester constituents of the mixed textile feed and to prepare the primary textile constituents for pulping and dissolution. Pretreatment of the mixed textile feedstock may be followed by at least one cellulose pulping or dissolution stage that promotes the molecular separation and isolation of cellulose polymers, such as by disrupting intermolecular hydrogen bonds. In some embodiments, cellulosic polymers isolated during the pulping and/or dissolution stage(s) are substantially thermoplastic and are moldable when energy (e.g., heat below the char point) is introduced to the system. Polyester constituents and other constituents of mixed textile feedstocks may be isolated in one or more pulping/dissolution stages, either prior or subsequent to a cellulose pulping or dissolution stage. In general, the predominant component of a mixed textile feed (e.g., cotton or polyester) is dissolved and isolated in a first pulping stage, and the non-dissolved product of the first pulping stage is then treated in an appropriate pulping or dissolution stage to recover one or more additional constituents.

Isolated cellulose and polyester (and other polymeric) materials produced using the processes described herein may be used in a variety of downstream applications, as described in more detail below. In some embodiments, isolated cellulose and polyester components may be extruded to form regenerated cellulosic and polyester fibers. In some aspects, isolated cellulose polymers may be regenerated to provide longer chain polymers and fibers (or polymers and fibers having other desirable characteristics different from the characteristics of the cellulose-containing feedstock) that are useful in various industrial processes, including textile production. In addition to employing raw feedstock materials that are typically discarded (wasted, at a cost), processing steps having generally low environmental impacts are preferred.

In one aspect, methods and systems of the present disclosure provide a closed-loop garment recycling process that transforms reclaimed garments and textiles into high-quality regenerated fibers for use in creating new textiles, apparel, and other fiber-based products. Used and waste garment collection, sorting, transport and processing may all be involved as part of a closed loop process. Retail enterprises (and others) may serve as collection stations and may offer incentives, rewards, or the like for donations. Further garment processing may take place at the donation site or at one or more remote sites. Cotton, cotton-like regenerated fabrics, rayon and other fibers may be produced using the reclaimed garments and textiles.

Figure 1:
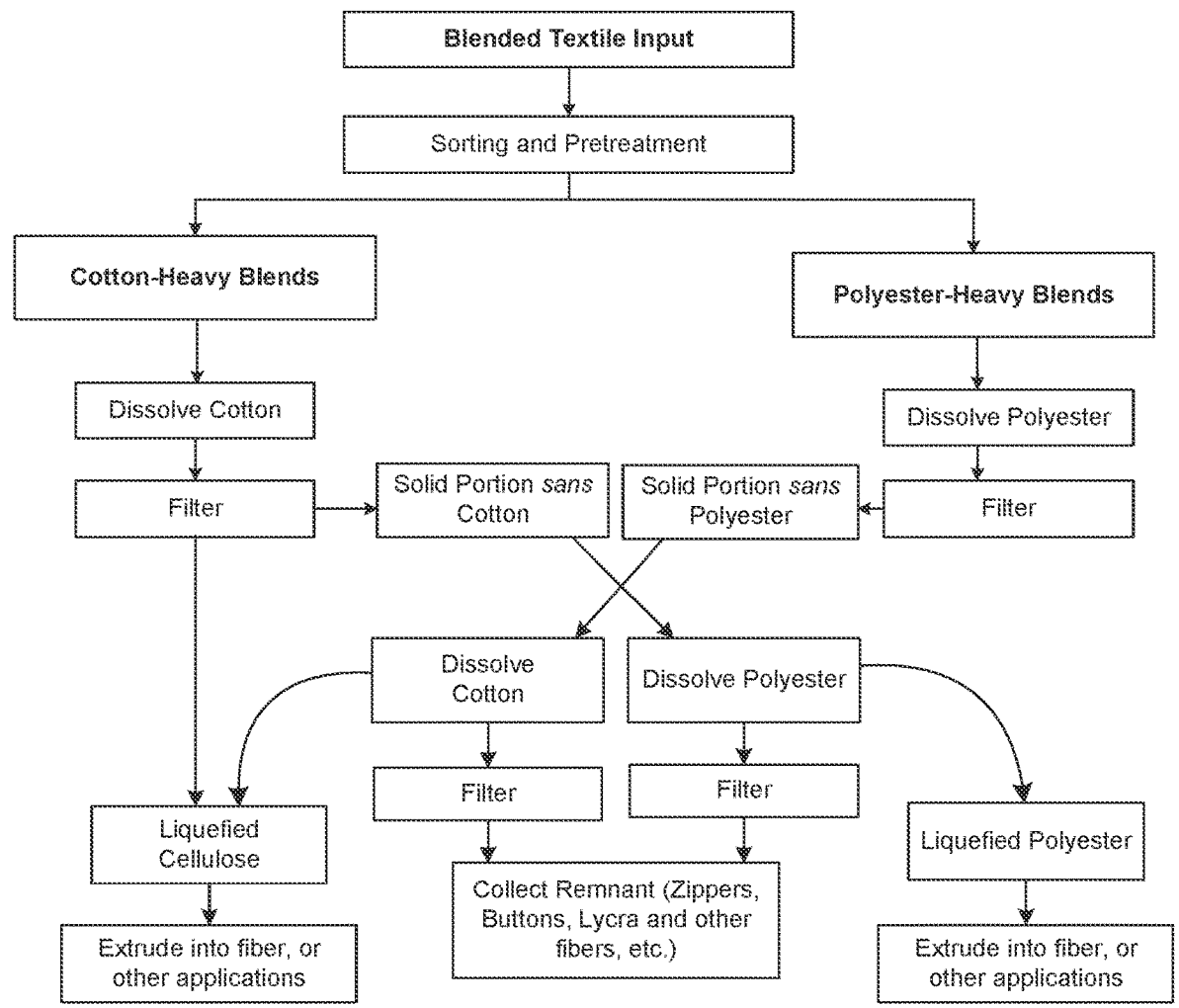
FIG. 1 illustrates an exemplary schematic flow diagram outlining process steps as disclosed herein for processing blended textile input to produce liquefied cellulosic and polyester output.

It will be understood that the appended drawings present many alternatives and various specific embodiments, and that there are many variations and combinations of processing steps, as well as additional aspects of systems and methods of the present invention. Specific process design features may be modified and used in different combinations, for example, for use in various intended applications and environments.

DETAILED DESCRIPTION

In one aspect, systems and methods disclosed herein process mixed textile feedstock materials to produce isolated cellulosic and polyester polymers suitable for use in downstream processing and in a variety of downstream applications and production pathways. Mixed textile feedstock materials that are useful as raw materials for this process include a wide range of materials, such as cellulose- and polyester-containing postconsumer waste, industrial and post-industrial fiber and fabric scraps, unworn or worn and discarded cotton-containing and polyester-containing apparel, and the like. The mixed textile feedstock preferably undergoes at least one pretreatment stage (and optionally multiple pretreatment stages) and at least one pulping or dissolution stage, sequentially, to isolate each of the predominant constituent components. In some embodiments in which mixed textile feedstock comprises mixed cotton and polyester textiles, a first pulping or dissolution stage following pretreatment isolates the predominant constituent (e.g., cotton or polyester), and the undissolved material remaining after the first pulping stage undergoes a second (different) pulping or dissolution stage to isolate another predominant constituent, thereby producing isolated cellulose and polyester molecules in separate product streams, each product stream being suitable for use in various different downstream application pathways.

The raw mixed textile feed material may be substantially homogeneous or at least somewhat heterogeneous (e.g., pre- or post-consumer waste, scrap textile fiber and fabric, cotton- and polyester- and mixed cotton/polyester-containing fabrics, etc.). When post-consumer textile materials are used as feedstock, used clothing collection and sorting may be accomplished via clothing retailers, manufacturers, recyclers, and various other organizations, providing access to large volumes of used, cellulose-containing garments and scrap materials that would otherwise be discarded. Depending on the type and homogeneity of the textile feedstock, optional sorting and removal of undesired components may be carried out prior to pretreatment of the mixed textile feedstock.

When reclaimed garments and textiles are used as mixed textile feed material, initial sorting of reclaimed garments and textiles according to fiber content may be advantageous prior to feedstock pretreatment and dissolving. In some embodiments, for example, reclaimed material (e.g., garments and textiles) may be sorted by cellulosic content— e.g., reclaimed materials may be separated into groups having different cellulosic contents, such as >90% or >80% or >70% or >50%, or other cellulosic contents, and less than 50% cellulosic content. Reclaimed fabric material having other fiber contents and compositions, e.g., having various polyester contents, may also be sorted and separated. Reclaimed textile materials may also be sorted by composition, such as separating cotton-wool blends, cotton-polyester blends, cotton-elastane blends, cotton-spandex blends, and the like.

Fabric feedstocks such as reclaimed garments and textiles typically incorporate a variety of dyes and/or chemical finishes and may be contaminated with other materials, such as dirt, grease, and the like. Raw textile feedstock (optionally treated to remove non-textile-containing materials, and optionally sized) is typically processed in one or more pre-treatment stage(s) to remove dyes, finishes, contaminants (oils, grease, etc.) and the like from the feedstock. Feedstocks including textile materials may optionally be mechanically treated to provide smaller sized, or more uniformly sized, feedstock. The fabric feedstock may be sized if desired, such as by shredding, to provide a sized feedstock having a fragmented, high surface area for fiber pulping. Feedstock sizing is typically accomplished using mechanical cutting, shredding, or other mechanical size reduction techniques. Processing to remove non-fabric components, such as buttons, zippers, fasteners, and the like may take place, if desired, prior to and/or following pretreatment.

Several different pre-treatment stages are described below, and various combinations of pretreatment stages may provide benefit, depending on the nature of the textile feedstock. Depending on the properties and composition of the mixed textile feedstock, one or more of the pretreatments may be used, alone or in combination with other pretreatments. Several (optional) pre-treatment stages are described below, and several advantageous pre-treatment combinations are also described. It will be appreciated that additional pre-treatments may be used in combination with the pre-treatments described, and that various specific combinations other than those specifically illustrated and described may be used.

FIG. 1 shows a schematic flow diagram illustrating the processing of a blended textile input according to methods described herein. In this scenario, blended textile input is separated into cotton-heavy and polyester-heavy blends during or following one or more sorting and pretreatment step(s). The constituent cotton and polyester polymers in each of the separated stages are dissolved and isolated to produce "liquefied" cellulose (i.e., isolated cellulose molecules) from the cotton-heavy feedstock and "liquefied" polyester (i.e., isolated polyester molecules) from the polyester-heavy feedstock. These isolated cellulosic and polyester materials may be extruded into regenerated fibers, as desired, or used for other downstream applications. The undissolved, non-cellulosic constituents remaining after dissolution of the cotton-heavy blend feedstock may be treated for dissolution of polyester to produce liquefied polyester. Likewise, the undissolved, non-polyester constituents remaining after dissolution of the polyester-heavy blend feedstock may be treated for dissolution of cellulose to produce liquefied cellulose. Undissolved components such as other fibers, zippers, buttons, and the like, may be collected and re-used or discarded. Additional processing details, conditions and reagents for pretreatment and pulping/dissolution stages are described below.

Figure 2:
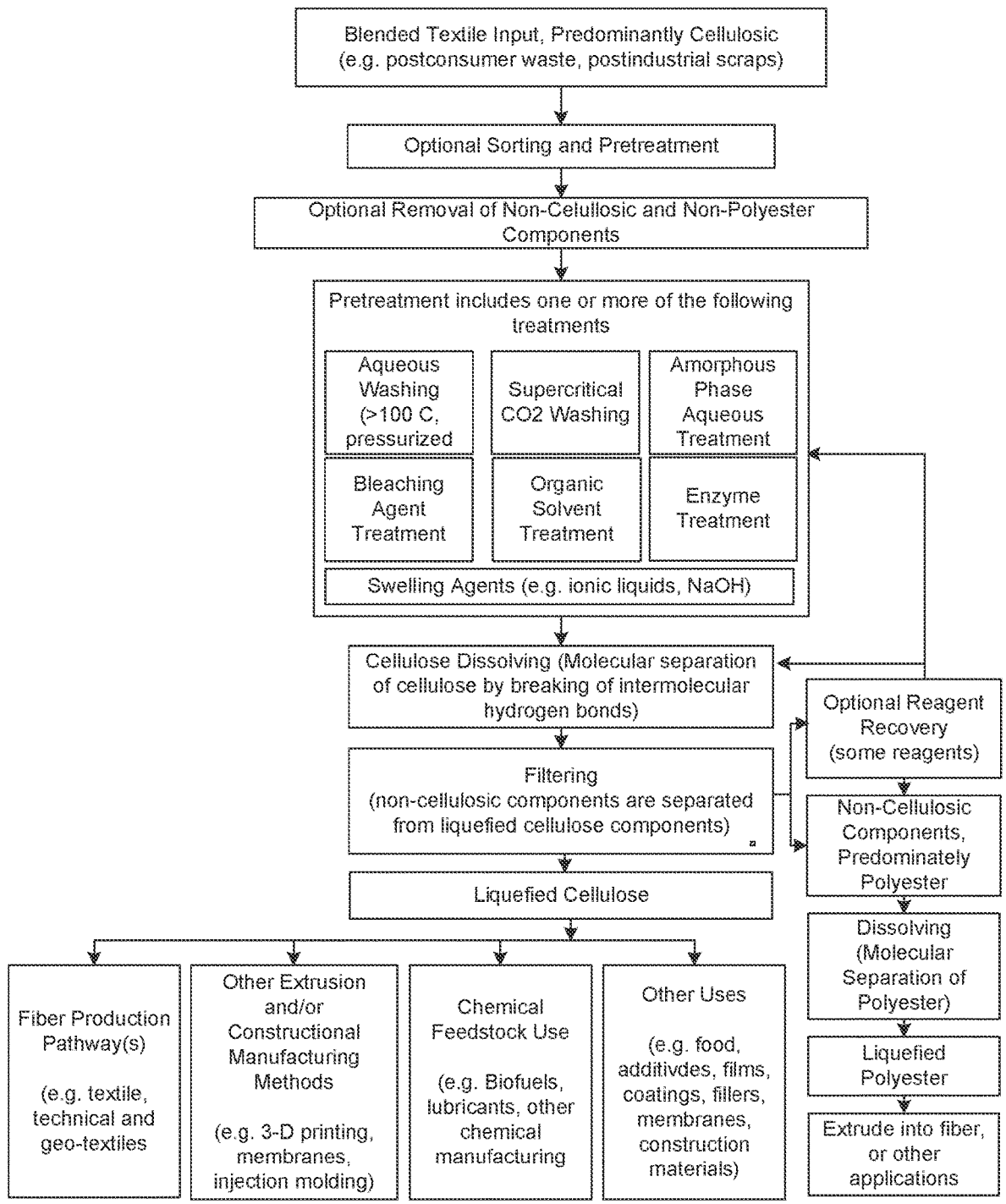
FIG. 2 illustrates an exemplary schematic flow diagram outlining process steps as disclosed herein for converting blended textile input comprising predominantly cellulose-containing materials to liquefied cellulose and liquefied polyester suitable for use in a variety of downstream applications.
Figure 3:
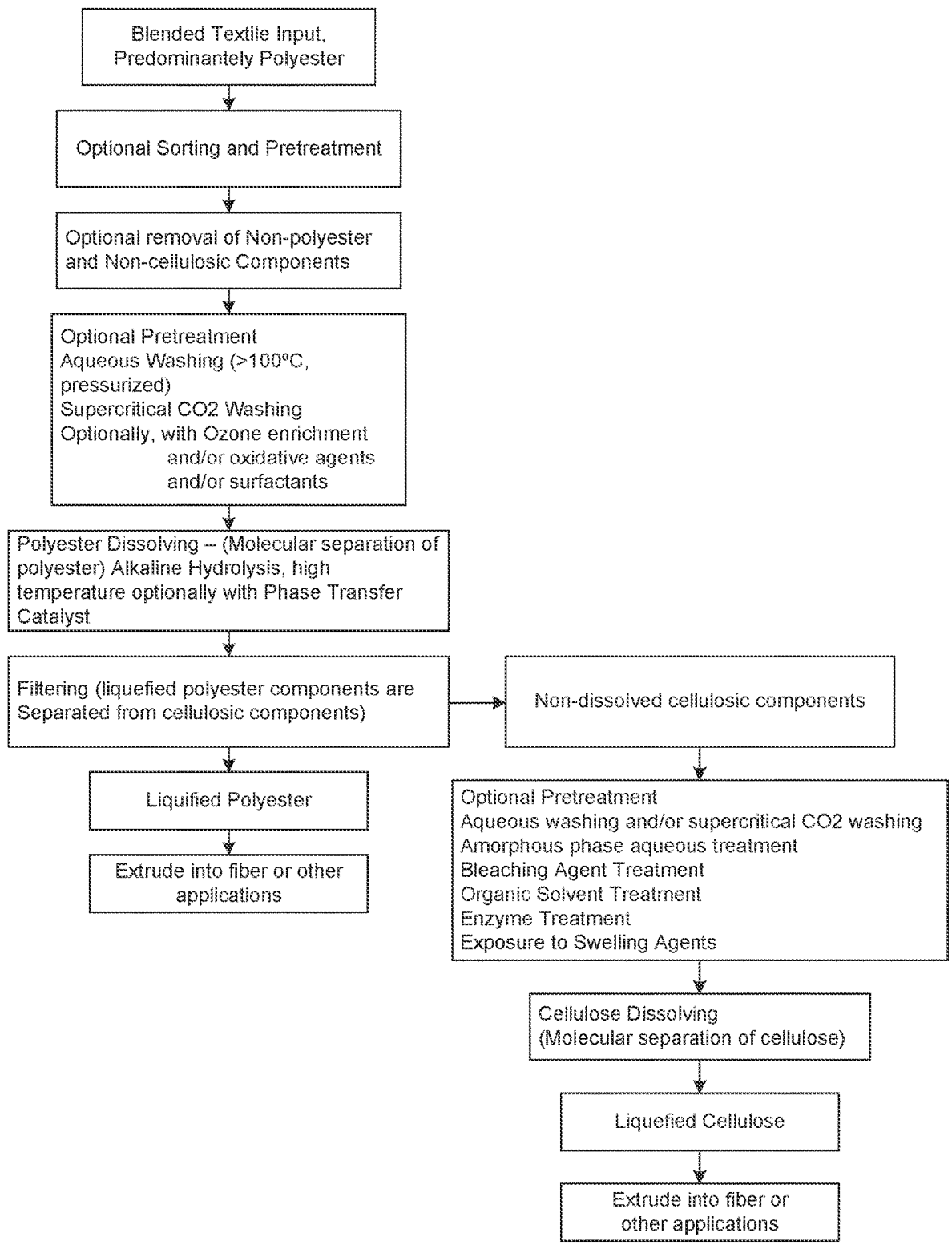
FIG. 3 illustrates an exemplary schematic flow diagram outlining process steps as disclosed herein for converting blended textile input comprising predominantly polyester-containing materials to liquefied polyester and liquefied cellulose suitable for use in a variety of downstream applications.

FIG. 2 illustrates an exemplary overall process flow diagram for treating predominantly cellulosic blended textile input to produce isolated cellulose polymers, identified in FIG. 2 as "Liquefied Cellulose," and isolated polyester polymers, identified in FIG. 2 as "Liquefied Polyester." The liquefied cellulose and polyester products may be suitable for use in a variety of downstream applications, such as fiber production (e.g., textiles, technical fibers and geo-textiles), production of other extrusion and/or constructional manufacturing methods (e.g., 3D printing media, membranes, injection molding media), use as a chemical feedstock for production of biofuels, lubricants and other chemical manufacturing, and for use as food additives, in films, coating, fillers, membranes, packaging, construction materials, nonwoven materials, and the like. FIG. 3 illustrates an exemplary overall process flow diagram for treating predominantly polyester blended textile feed materials to produce liquefied polyester and liquefied cellulosic components suitable for fiber extrusion and including additional processing stages for production of regenerated fibers.

In general, mixed textile feed materials may undergo optional feedstock preparation stages, such as feedstock sorting and/or removal of non-cellulosic components. The mixed textile feedstock then undergoes at least one pretreatment stage, followed by a first pulping and/or dissolution stage to isolate one constituent of the pretreated mixed feedstock (e.g., cellulose or polyester) and a second pulping and/or dissolution stage to isolate another constituent of the pretreated mixed feedstock. Additional pulping and/or dissolution stages may be implemented to isolate additional constituents.

Several pretreatment stages are described below and are illustrated in the accompanying diagrams. Depending on the composition of the mixed textile feedstock and desired attributes of the desired product, one or more than one of the pretreatment stages may be used alone or in combination with other pretreatment stages. Specific combinations of pretreatments that may be useful in particular applications are described in greater detail below with reference to FIGS. 5-9. Each of the pretreatment stages is described in more detail below.

High Temperature Aqueous Washing

In one embodiment, methods disclosed herein provide pretreatment of mixed textile feed materials using a high temperature aqueous washing process. This pretreatment stage is particularly useful for pretreatment of mixed textile feed materials comprising recycled garments and may facilitate removal of contaminants such as soils, deodorants, lanolin, silicone and cationic softeners from the textile feedstock, as well as stripping various fabric treatments, such as optical brighteners, moisture wicking enhancers, and the like, from the feed material. Aqueous media maintained at a temperature above 100° C., optionally above the boiling point of the aqueous media, generally above 120° C., often between 120° C. and 170° C., sometimes between 130° C. and 150° C., and up to 200° C., may be used. In some embodiments, the high temperature aqueous washing pretreatment stage is conducted in a closed vessel batch system with circulation or agitation or mixing of the hot aqueous media. Pressure conditions in a closed vessel system, as described, may range from about 100 kPa to about 2000 kPa, depending on the temperature of the aqueous media, with higher pressure conditions accompanying higher temperature media.

Aqueous media used in a high temperature pretreatment stage may comprise water alone, or it may comprise an aqueous solution having one or more additives. In some embodiments, the aqueous media may comprise water enriched with ozone. In some embodiments, the aqueous media may comprise water enriched with oxidative agents such as hydrogen peroxide or sodium perborate. In additional embodiments, surfactants (e.g., Sodium stearate, Fatty Alcohols 4-(5-Dodecyl) benzenesulfonate, Alcohol ethoxylates and the like) and/or various hydroxide compositions (e.g., Ca, Mg, Na, K, and Li hydroxides), may be mixed and circulated with the aqueous media in a high temperature aqueous pretreatment stage and may act as wetting agents.

In some embodiments, the high temperature aqueous washing stage incorporates an aqueous solution comprising NaOH at a concentration of from about 1% to about 15%, at a pH in excess of about 11, and in some embodiments in excess of about 12. Residence times are sufficient to substantially remove impurities from the mixed textile feedstock.

The aqueous wash solution may be evacuated following a suitable residence time. In some embodiments, multiple aqueous washing stages may be implemented, using the same or different aqueous solutions, all at high temperature and pressure conditions. Optional rinsing of the solids with an aqueous solution may be implemented following evacuation of the wash solution. Rinsing may take place at ambient temperatures and pressures, with optional agitation and mixing, and the rinse solution is removed following a suitable residence time. Treated solids may undergo one or more additional pretreatment stage(s) or may be further processed in one or more pulping and/or dissolution stage(s).

Supercritical CO2 Washing

In some embodiments, a water-less and/or "non-toxic" pretreatment may be used to remove contaminants such as dyes, finishes, surface impurities and other contaminants from mixed textile feed materials. In this treatment stage, textile feed material may be introduced to a closed and pressurized chamber, where the feed material contacts supercritical carbon dioxide, alone or in combination with additional reagent(s). In some embodiments, the supercritical CO2 may be enriched with ozone. In some embodiments, the supercritical CO2 may enriched with oxidative agents such as hydrogen peroxide or sodium perborate. In additional embodiments, surfactants (e.g., Sodium stearate, Fatty Alcohols, 4-(5-Dodecyl) benzenesulfonate, Alcohol ethoxylates and the like) may be mixed and circulated with the supercritical CO2 in a pretreatment stage. Following a suitable residence time, supercritical carbon dioxide containing dissolved contaminants is withdrawn to a separator, where the carbon dioxide may be decompressed and returned to a gaseous state, while the contaminants may be collected and removed. The gaseous carbon dioxide may be recycled in a closed loop process and re-used for additional pretreatment cycles. Treated solids may undergo one or more additional pretreatment stage(s) or may be further processed in one or more pulping and/or dissolution stage(s).

Amorphous Phase Aqueous Treatment

In some embodiments, mixed textile feedstocks (and/or cellulose-containing treated solids) are treated, prior to pulping or dissolution, with a high temperature (>320° C.), high pressure (>2.5 Mps) aqueous treatment, in a closed and substantially rigid reaction vessel. This pretreatment stage promotes breakdown of the crystalline structure of cellulose and facilitates modification of cellulosic constituents to an amorphous, non- or less-crystalline structure that is more amenable to pulping and/or dissolution.

Treatment with Oxidative and/or Reducing Agent(s)

In some embodiments, a pretreatment stage involves exposing the textile feed material (and/or cellulose-containing treated solids) to a "bleaching" agent, such as an oxidative or reducing agent, typically in an aqueous solution, at an oxidative/reducing agent concentration and for a residence time sufficient to remove materials such as dyes, finishes, and other contaminants from the cellulosic feedstock. Suitable oxidative and/or reducing agents include, for example, peroxide compositions (e.g., H2O2, Na2O2) and perborate (e.g., NaBO3) compositions. Additional oxidative and/or reducing agents that may be used in pretreatment stages as described herein include one or more of the following compositions: per carbonate compositions; sodium carbonate; per acetic acid compositions; potassium permanganate; persulfate compositions; ozone; sodium chloride; chlorine dioxide; calcium oxychloride, sodium hypochlorite; calcium hypochlorite; lithium hypochlorite; cloramine; isocynual trichloride; Sulphur dioxide; sodium hydrosulfite; sulphoxylates; acidic sodium sulphite; sodium bosulphite; sodium meta bisulphite; TAED (tetra-acetyl-ethylene-diamine); and sodium hydrosulfite.

In some embodiments, bleaching agent treatment may involve treatment in an aqueous solution of calcium hypochloride (bleach powder) or sodium hypochlorite (NaOCl) in combination with sodium carbonate (soda ash) at a pH in excess of 8 and, in some embodiments, at a pH in excess of 9. Agitation or mixing of the materials in the bleaching agent pretreatment stage may be provided, and treatment with an oxidative and/or reducing agent may take place in a closed reaction vessel.

The bleaching agent solution may be evacuated following a suitable residence time and optional rinsing of the solids with an aqueous solution may be implemented. Aqueous rinsing may take place at ambient temperatures, with the rinse solution removed following a suitable residence time. The bleaching agent may be neutralized, following this treatment, by introduction of a weak acid such as hydrogen peroxide. In some embodiments, multiple bleaching agent treatment cycles may be implemented using different oxidative or reducing reagents to treat the solids at different concentrations, pH conditions, temperature and/or residence times, as appropriate. Recycling and regeneration of the oxidative or reducing agent(s) may be incorporated in the process, as is known in the art. Introduction of other weak acids may be effective to reduce the pH of the treated, cellulose-containing solids, if desired, following optional rinsing steps.

Pretreatment with Organic Solvent(s)

In some embodiments, methods disclosed herein provide pretreatment of textile feed materials (and/or cellulose-containing treated solids) by exposure to aqueous media containing one or more organic solvents. Suitable organic solvents may be selected from the group consisting of: acetic acid; acetone; acetonitrile; benzene; 1-butanol; 2-butanol; 2-butanone; t-butyl alcohol; carbon tetrachloride; chlorobenzene; chloroform; cyclohexane, 1,2-dichloroethane; diethylene glycol; diethyl ether; diglyme (diethylene glycol dimethyl ether); 1,2-dimethoxy-ethane (glyme, DME); dimethyl formamide (DMF); dimethyl sulfoxide (DMSO); 1,4-dioxane; ethanol, ethyl acetate; ethylene glycol; glycerin; heptane; hexamethylphosphoramide (HMPA); hexamethylphosphorous tramide (HMPT); hexane; methanol; methyl t-butyl ether (MTBE); methylene chloride; nitromethane; pentane; 1-propanol; 2-propanol; pyridine; tetrahydrofuran (THF); toluene; triethyl amine; o-xylene; and m-xylene. The aqueous media containing organic solvent(s) is generally maintained at a basic pH, generally at a pH in excess of 9, and often at a pH of 10 or above. Treatment with organic solvents may be achieved using high temperature or cooler aqueous media.

Enzymatic Treatment

In some embodiments, methods disclosed herein may optionally employ enzymatic treatment to shorten cellulose molecules, increase cellulose solubility and/or reduce reaction times in subsequent treatment stages. Suitable enzymes may include endogluconases (e.g., Cel 5A, Cel 7B, Cel 12A, Cel 45, Cel 61A); Cellobiohydrolases (e.g., Cel 6A, Cel 7A); LPMO/GH61; cellulases; and the like. In general, temperatures of from about 30° to 90° C., pH between about 4 to about 9 and dwell times of from about 20 min to 48 hours may be suitable for enzymatic treatment.

Enzymatic treatment(s) involving xylanases, alkaline pectinases, lipases, and/or esterases may also be used for feedstock pretreatment prior to pulping. In yet additional embodiments, feedstock may be treated using enzymatic cultures containing biological organisms (fungi, bacteria, etc.) that secrete cellulolytic enzymes (e.g., cellulases). Enzyme cultures such as *Trichoderma Reesei, Trichoderma viride, Penicillium janthinellum, Halorhabdusutahensis, A Niger, Humicola*, and mixtures of such enzyme-producing cultures, are suitable. Mechanical treatments such as pulverization and/or emulsification treatment(s) may be implemented following enzymatic treatment.

Treatment with Swelling Agents

For some applications (for example, those in which natural or light-colored or undyed regenerated fiber is desired as an end-product), optional treatment using a swelling agent, such as an ionic liquid, may be employed prior to pulping to enhance the absorption of and penetration of the pulping agent. Treatment with a swelling agent (e.g. an ionic liquid) may be preceded by or implemented in combination with one or more other pretreatment stage(s). Ionic liquids may comprise hydroxides, such as Ca, Mg, Na, K, and/or Li hydroxides, and/or Mg salts. Swelling agents suitable for use as reagents in a pretreatment stage may alternatively or additionally comprise one or more of the following reagents: [AMIM]Cl 1-Allyl-3-methylimidazolium chloride; [BzPy]Cl Benzylpyridinium chloride; [BMIM]Ace 1-Butyl-3-methylimidazolium acesulphamate; [BMIM]DBP 1-Butyl-3-methylimidazolium dibutylphosphate; [BMIM]Cl 1-Butyl-3-methylimidazolium chloride; [BMIM]PF6 1-Butyl-3-methylimidazolium hexafluorophosphate; [BMIM]BF4 1-Butyl-3-methylimidazolium tetrafluoroborate; [BMPy]Cl 1-Butyl-3-methylpyridinium chloride; [DBNH]AcO 1,8-Diazabicyclo[5.4.0]undec-7-enium acetate; [DBNH]EtCOO 1,8-Diazabicyclo[5.4.0]undec-7-enium propionate; [DMIM]DEP 1,3-Dimethylimidazolium diethylphosphate; [DMIM]DMP 1,3-Dimethylimidazolium dimethylphosphate; [EMBy]DEP 1-Ethyl-3-methylbutylpyridinium diethylphosphate; [EMIM]AcO 1-Ethyl-3-methylimidazolium acetate; [EMIM]Br 1-Ethyl-3-methylimidazolium bromide; [EMIM]DBP 1-Ethyl-3-methylimidazolium dibutylphosphate; [EMIM]DEP 1-Ethyl-3-methylimidazolium diethylphosphate; [EMIM]DMP 1-Ethyl-3-methylimidazolium dimethylphosphate; [EMIM]MeSO 4 1-Ethyl-3-methylimidazolium methanesulphonate; [HPy]Cl 1-Hexylpyridinium chloride; [E(OH)MIM]AcO 1-Hydroxyethyl-3-methylimidazolium acetate; [DBNMe]DMP 1-Methyl-1,8-diazabicyclo[5.4.0]undec-7-enium dimethylphosphate; [P4444]OH Tetrabutylphosphonium hydroxide; [TMGH]AcO 1,1,3,3-Tetramethylguanidinium acetate; [TMGH]n-PrCOO 1,1,3,3-Tetramethylguanidinium butyrate; [TMGH]COO 1,1,3,3-Tetramethylguanidinium formiate; [TMGH]EtCOO 1,1,3,3-Tetramethylguanidinium propionate; [P8881]AcO Trioctylmethylphosphonium acetate; and HEMA Tris-(2-hydroxyethyl)methylammonium methylsulphate.

In one exemplary embodiment, textile feed materials (and/or cellulose-containing treated solids) may be treated with an ionic solution such as an aqueous solution comprising Ca, Mg, Na, K, and/or Li hydroxides, followed by exposure to a sodium hydrosulfite ($Na_2S_2O_4$) reducing agent and/or a bleaching agent such as peroxide, perborate, persulfate, chlorine dioxide and sodium or calcium hypochlorite. Small amounts of Bromium (Br) may be used as a catalyst during this treatment. This treatment is generally carried out at a pH in excess of 9, and often at a pH of 10 or 10.5 or above. Treatment with swelling agents such as ionic liquids may be achieved using high temperature or cooler aqueous wash media. In some embodiments, treatment with a swelling agent (e.g., an ionic liquid) is conducted at temperatures of 0° C. or lower, provided the aqueous solution or slurry is prevented from freezing, and provided the viscosity of the solution is maintained at an acceptable level. In some embodiments, and particularly when ionic liquids having an acetate group are used, the treatment may be carried out at an acidic pH, typically at a pH less than 6, and in some embodiments at a pH less than 5. In some embodiments, the proportion of cellulose-containing feed materials (and/or cellulose-containing treated solids) in the ionic solution is from about 2% to about 40%; in some embodiments, the proportion of cellulose-containing feed materials (and/or cellulose-containing treated solids) in the ionic solution is from about 5% to about 25%.

It will be appreciated that numerous (optional) pretreatment processes are described herein and are illustrated in FIGS. 2 and 3. Pretreatment of textile feedstock material, as described, may implement any of these pretreatment processes, singly or in combination with one or more other pretreatment processes. In some embodiments, carrying out elevated temperature aqueous pretreatment in a closed vessel is preferred, alone or in combination with other pretreatment stages, prior to (separate) pulping and dissolution of cellulose and polyester polymers. In some embodiments, carrying out elevated temperature aqueous pretreatment with the use of ozone enrichment, oxidative agents and/or surfactants is preferred, alone or in combination with other pretreatment stages, prior to (separate) pulping of textile constituents. In some embodiments, treatment in ionic solution followed by exposure to a reducing and/or bleaching agent is a preferred textile pretreatment step, preferably in combination with a washing step. In some embodiments, pretreatment involves elevated temperature aqueous pretreatment, followed by ionic pretreatment, followed by enzymatic pretreatment. In some embodiments, one or more of the pretreatment stages, or all pretreatment stages, are carried out a pH of at least about 9. In some embodiments, one or more of the pretreatment stages, of all of the pretreatment stages, are carried out at a pH of at least about 10.

Pretreatment preferably takes place in a closed vessel and, in batch treatment schemes, one or more pretreatment reagents may be introduced to and withdrawn from a closed vessel during various pretreatment stages, with or without intermediate rinsing or washing stages. In some embodiments, the vessel may be provided in the form of a rotating cylinder with a pressurized hull (housing) capable of withstanding pressures in the range of from 1000-5000 kPa, having inlet and outlet ports, pH and rpm control features, and having liquid agitation or circulation features. The inner reaction vessel surfaces may comprise anticorrosive metal(s) capable of withstanding concentrated acidic and alkali solutions. In some processes, both pretreatment and pulping may take place in the same vessel.

Specific pretreatment combinations are described below with reference to the schematic flow diagrams shown in FIGS. 5-9. Each of these flow diagrams describes different pretreatment combinations for cellulose-containing feed materials. These pretreatment combinations may also be used with mixed textile feedstocks, followed by molecular isolation and separation of cellulose, polyester and other constituent polymers in (separate) pulping or dissolution stages. Cellulose polymers may be separated from the cellulose pulping stage, such as by filtration, and regenerated cellulosic fibers may be extruded, such as in connection with a precipitation bath (e.g., an acid bath). Polyester fibers may be separated from a polyester pulping stage and processed to form regenerated polyester fibers. Extruded fibers may be designed and parameters changed, depending on the type, character and physical attributes of the fibers desired. Drying and winding produces regenerated fibers.

FIG. 2 illustrates treatment of blended textile input comprising predominantly cellulosic content materials (with optional sorting and removal of non-cellulosic and non-polyester components) using one or more of the pretreatment stages described above. Pretreatment is followed by a cellulose dissolving/pulping stage in which cellulose molecules are "dissolved" and isolated from other constituents. The "liquefied" cellulose is separated by filtration (or another separation technique) and used in downstream application(s) to produce fiber, other extrusion products, chemicals, additives, membranes, or the like. Non-cellulosic components (e.g., polyester constituents) are separated from the cellulose dissolving/pulping stage and treated in a separate polyester dissolving/pulping stage to produce isolated, "liquefied" polyester. The isolated polyester may, similarly, be used to produce regenerated fiber or in other application pathways.

FIG. 3 illustrates treatment of blended textile input comprising predominantly polyester content materials (with optional sorting and removal of non-cellulosic and non-polyester components) using one or more of the pretreatment stages described above. Pretreatment is followed by a polyester dissolving/pulping stage in which polyester molecules are "dissolved" and isolated from other constituents. The "liquefied" polyester constituents are separated by filtration (or another separation technique) and used in downstream application(s) to produce fiber, other extrusion products, chemicals, additives, membranes, or the like. Cellulosic components are separated from the polyester dissolving/pulping stage and treated in a separate cellulosic dissolving/pulping stage to produce isolated, "liquefied" cellulose. The isolated polyester may, similarly, be used to produce regenerated fiber or in other application pathways.

Figure 4A:
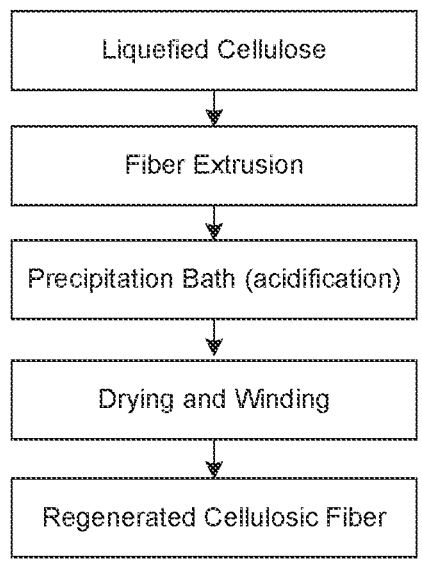
FIGS. 4A and 4B schematically illustrate the processing of liquefied cellulose and liquefied polyester, respectively, to produce regenerated cellulosic fiber and regenerated polyester fiber, respectively.
Figure 4B:
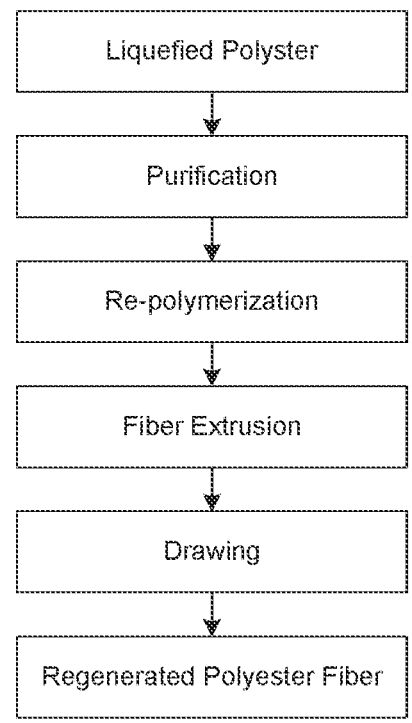

FIGS. 4A and 4B show exemplary schematic flow diagrams illustrating the treatment of liquefied cellulose and liquefied polyester, respectively, to produce regenerated cellulosic fiber and regenerated polyester fiber, respectively.

Figure 5:
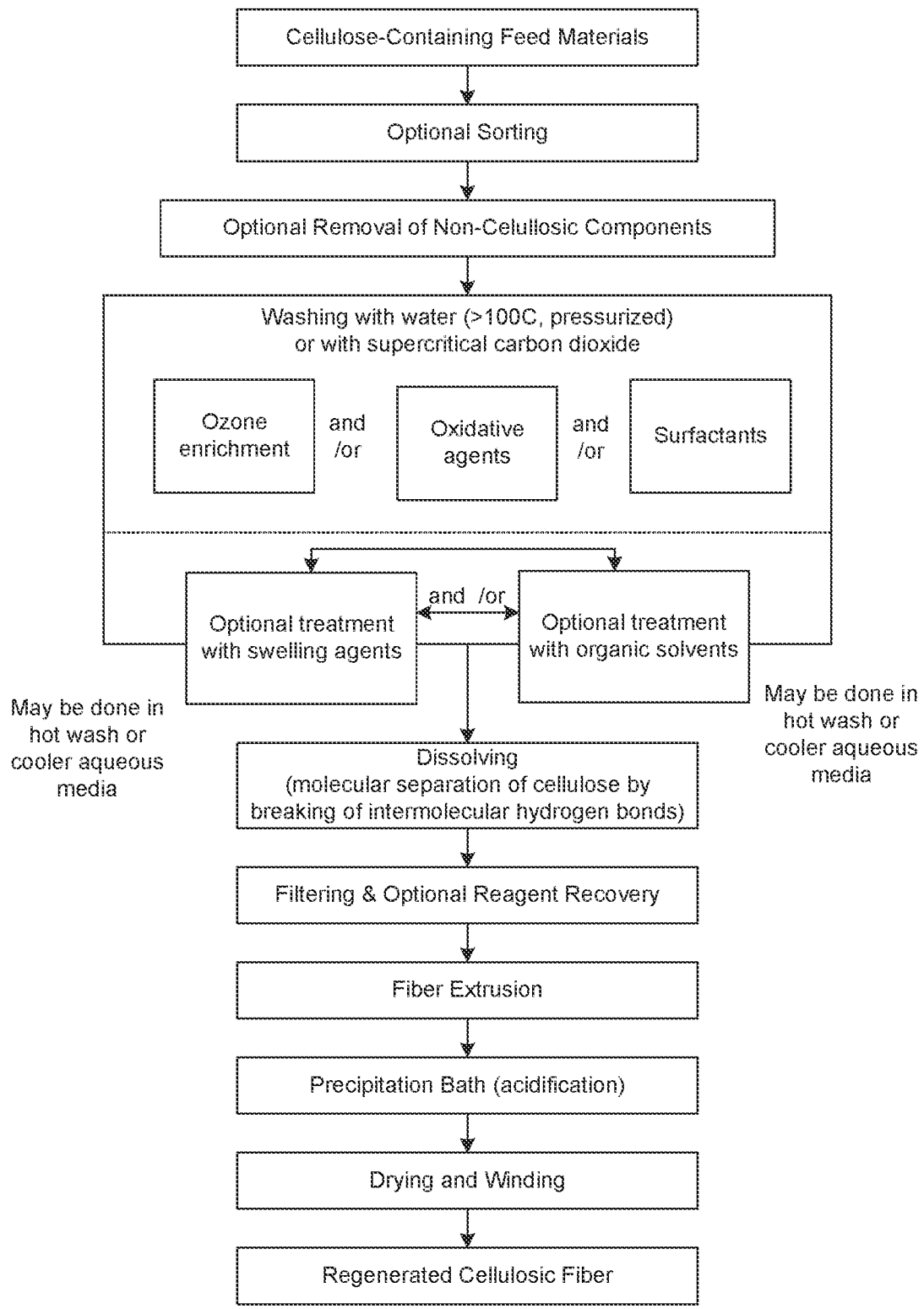
FIG. 5 illustrates an exemplary schematic flow diagram outlining process steps as disclosed herein for converting cellulose-containing materials to regenerated cellulosic fiber incorporating a high temperature aqueous or supercritical carbon dioxide pretreatment step and incorporating optional additional treatment steps.

FIG. 5 illustrates treatment of cellulose-containing materials (with optional sorting and removal of non-cellulosic components) using a high temperature aqueous wash or supercritical carbon dioxide pretreatment stage in combination with ozone enrichment and/or oxidative agent(s) and/or surfactant(s). Following evacuation of the hot aqueous or supercritical $CO_2$ media used for washing, and optional rinsing of the cellulosic solids, the cellulosic solids may optionally be treated with swelling agents (as described above), and/or with organic solvents (again, as described above). These treatment stages may be done at elevated temperatures or in cooler aqueous media.

Figure 6:
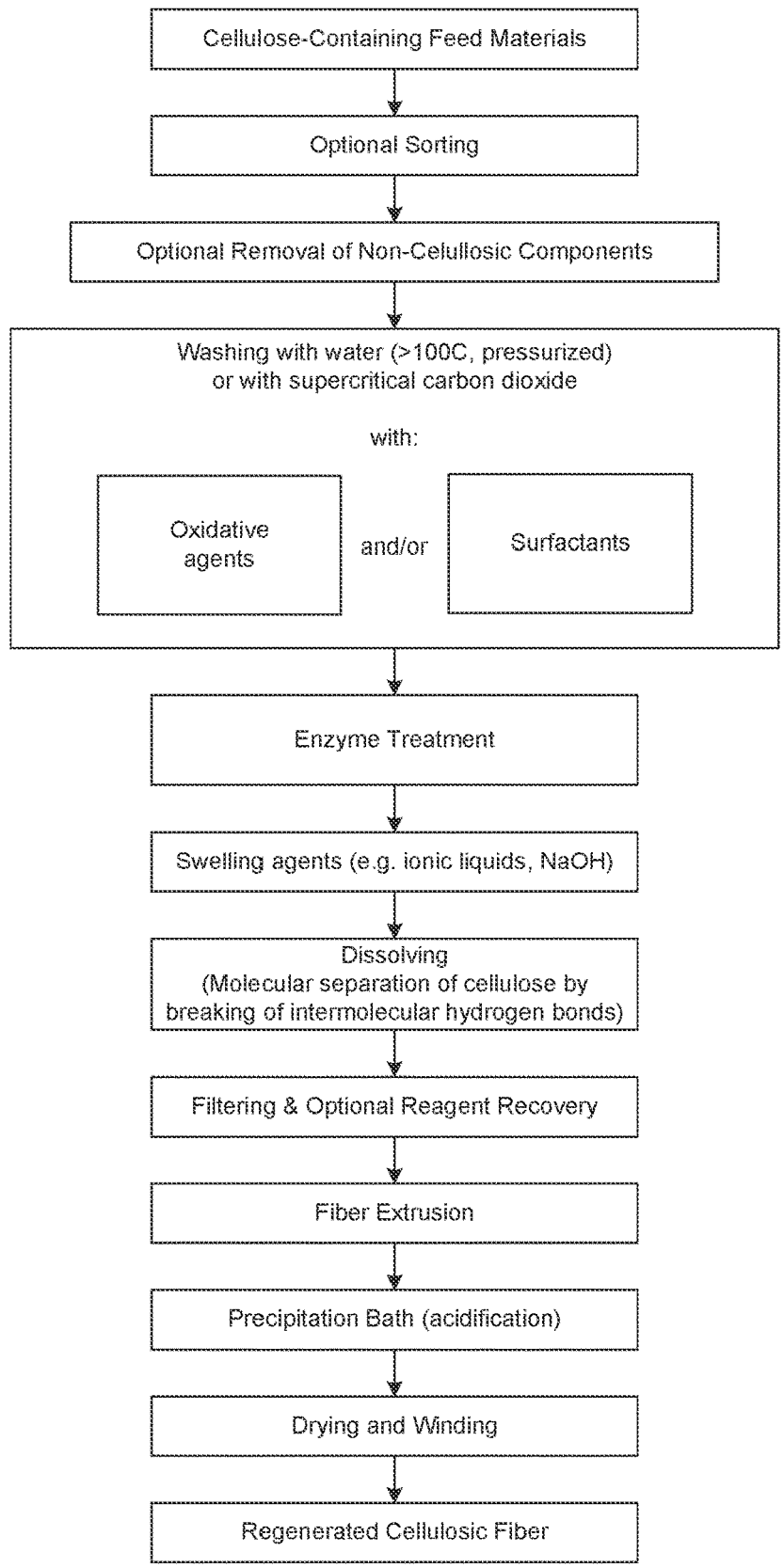
FIG. 6 illustrates an exemplary schematic flow diagram outlining process steps as disclosed herein for converting cellulose-containing materials to regenerated cellulosic fiber incorporating a combination of pretreatment steps.

FIG. 6 illustrates treatment of cellulose-containing materials (with optional sorting and removal of non-cellulosic components) using a high temperature aqueous wash or supercritical carbon dioxide pretreatment stage in combination with oxidative agent(s) and/or surfactant(s). Following evacuation of the hot aqueous or supercritical $CO_2$ media used for the washing stage, and following optional rinsing of the cellulosic solids, the cellulosic solids may optionally undergo enzymatic treatment as described above. The cellulosic solids may subsequently be exposed to swelling agents such as ionic liquids (e.g., NaOH) prior to a pulping or dissolution stage.

Figure 7:
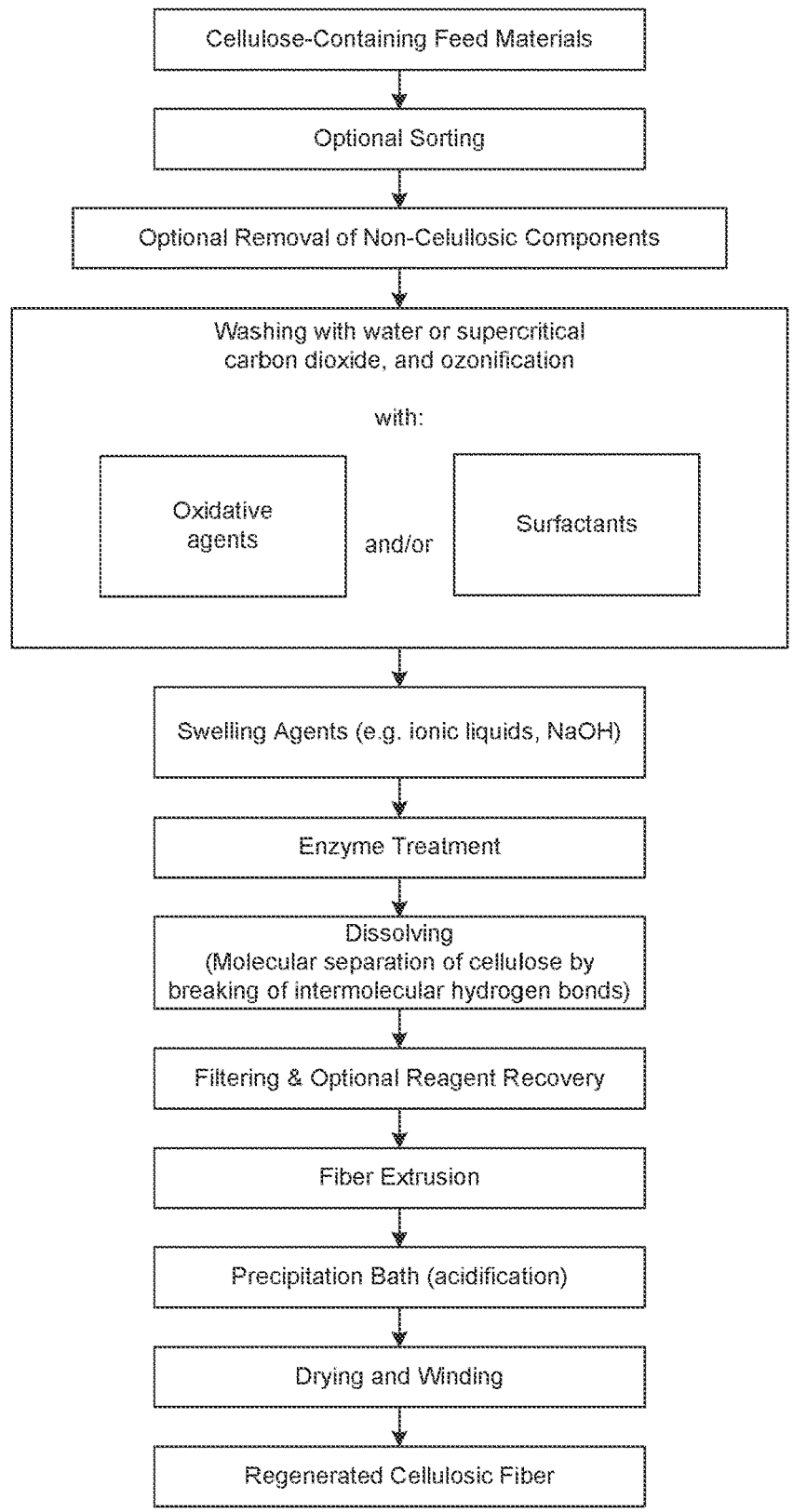
FIG. 7 illustrates an exemplary schematic flow diagram outlining process steps as disclosed herein for converting cellulose-containing materials to regenerated cellulosic fiber incorporating another combination of pretreatment steps.

FIG. 7 illustrates treatment of cellulose-containing materials (with optional sorting and removal of non-cellulosic components) using a high temperature aqueous wash or supercritical carbon dioxide pretreatment stage in combination with oxidative agent(s) and/or surfactant(s). Following evacuation of the hot aqueous or supercritical $CO_2$ media used for the washing stage, and following optional rinsing of the cellulosic solids, the cellulosic solids may optionally be exposed to swelling agents such as ionic liquids (e.g., NaOH), followed by enzymatic treatment as described above prior to a pulping or dissolution stage.

Figure 8:
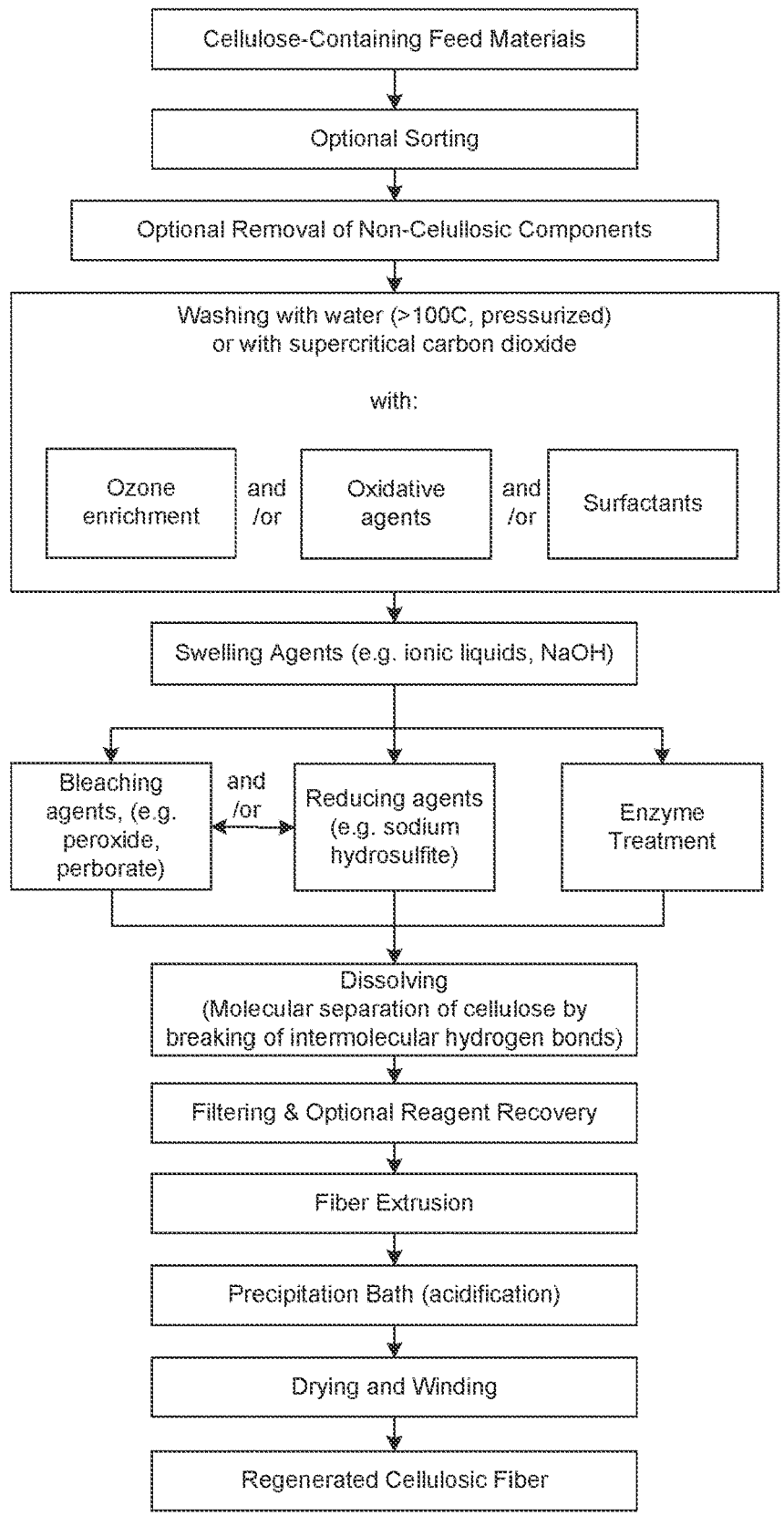
FIG. 8 illustrates an exemplary schematic flow diagram outlining process steps as disclosed herein for converting cellulose-containing materials to regenerated cellulosic fiber incorporating another combination of pretreatment steps.

FIG. 8 illustrates treatment of cellulose-containing materials (with optional sorting and removal of non-cellulosic components) using a high temperature aqueous wash or supercritical carbon dioxide pretreatment stage in combination with optional ozone enrichment and/or oxidative agent(s) and/or surfactant(s). Following evacuation of the hot aqueous or supercritical $CO_2$ media used for the washing stage, and following optional rinsing of the cellulosic solids, the cellulosic solids may optionally be exposed to swelling agents such as ionic liquids (e.g., NaOH), followed by exposure to bleaching agents and/or reducing agents and/or an optional enzyme treatment, all as described above, prior to a pulping or dissolution stage.

Figure 9:
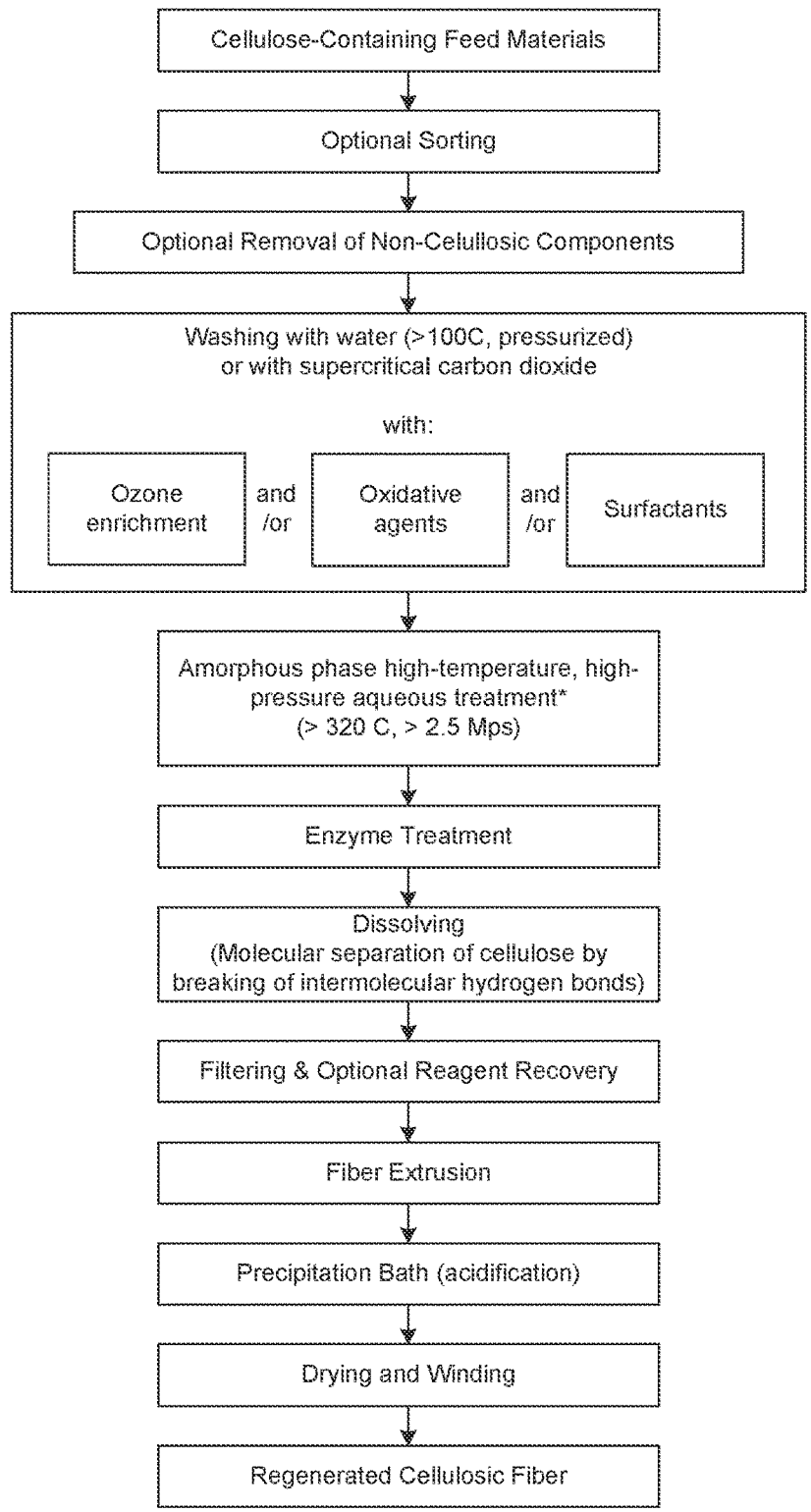
FIG. 9 illustrates an exemplary schematic flow diagram outlining process steps as disclosed herein for converting cellulose-containing materials to regenerated cellulosic fiber incorporating yet another combination of pretreatment steps.

FIG. 9 illustrates treatment of cellulose-containing materials (with optional sorting and removal of non-cellulosic components) using a high temperature aqueous wash or supercritical carbon dioxide pretreatment stage in combination with optional ozone enrichment and/or oxidative agent(s) and/or surfactant(s). Following evacuation of the hot aqueous or supercritical CO2 media used for the washing stage, and following optional rinsing of the cellulosic solids, the cellulosic solids may optionally undergo a high-temperature, high-pressure aqueous treatment stage, as described above, to promote destruction of the cellulosic crystalline structure and favor conversion of cellulosic polymers to an amorphous phase. The cellulosic solids may be exposed to enzyme treatment, as described above, prior to a pulping or dissolution stage.

Pre-treated mixed constituent solids are subjected to at least two pulping or dissolving stages, in which the solids are treated with pulping reagents to promote molecular separation of cellulose and other constituents, such as polyester, from the solids. Pulping to isolate the highest content constituent (e.g., cellulose, polyester, etc.) is typically carried out first, followed by pulping to isolate one or more other constituents. Pulping to isolate cellulose polymers involves the destruction of intermolecular hydrogen bonds and other non-covalent bonds, isolating cellulose polymers from cellulose-containing solids in a dissolved or "liquefied" cellulose state. In some embodiments, the number of intermolecular hydrogen bonds present in the cellulose polymers is reduced by at least 20% in the fiber pulping stage; in some embodiments the number of intermolecular hydrogen bonds present in the cellulose polymers is reduced by at least 50% in the fiber pulping stage; in yet other embodiments, the number of intermolecular hydrogen bonds present in the cellulose polymers is reduced by at least 70% in the fiber pulping stage. The viscosity of pulped cellulose, following the pulping treatment, is generally from about from 0.2 to as high as 900 cP, often from about 0.5 to about 50 cP. Solids remaining following isolation (e.g., dissolution) of cellulose, may be treated to isolate other constituents (e.g., polyester).

Cellulose Pulping and Isolation

A variety of pulping techniques and pulping chemistries for isolating cellulose are available, and one or more of the pretreatment stages described above may be used with a variety of known pulping reagents, including those described in PCT Int'l Patent Publication WO 2013/124265 A1, the disclosure of which is incorporated herein by reference in its entirety.

In some embodiments, copper-containing reagents are preferred for use as pulping reagents for isolation of cellulose. In one embodiment, for example, Schwiezer's Reagent (the chemical complex tetraaminecopper (II) hydroxide-[Cu(NH$_3$)$_4$(H$_2$O)$_2$]$^{2+}$) or tetraamminediaquacopper dihydroxide, [Cu(NH$_3$)$_4$(H$_2$O)$_2$](OH)$_2$ is a preferred pulping agent to isolate and promote molecular separation of cellulose polymers. Schweizer's reagent may be prepared by precipitating copper(II) hydroxide from an aqueous solution of copper sulfate using sodium hydroxide or ammonia, then dissolving the precipitate in a solution of ammonia. In some embodiments, a combination of caustic soda, ammonium and cupramonium sulfate may be formulated to provide Schwiezer's Reagent.

Solutions comprising copper(II) hydroxide and ammonia may be introduced and used in the cellulose pulping stage to form Schweizer's Reagent according to the following reaction: Cu(OH)$_2$+4NH$_3$+2H$_2$O→[Cu(NH$_3$)$_4$(H$_2$O)$_2$]$^{2+}$2OH. In this scheme, the copper hydroxide reagent may be manufactured from recycled copper recovered, for example, from electronics and computer component waste materials. Copper hydroxide is readily made from metallic copper by the electrolysis of water using copper anodes. Ammonia may be manufactured by an innovative use of the Haber-Bosch process (3H$_2$+N$_2$→2NH$_3$), capturing hydrogen from organic wastes and combining it with atmospheric nitrogen. This method may produce ammonia at low cost and eliminate greenhouse gas emissions from organic waste feedstock. Using these reagent resources and methods for generating Schweizer's Reagent, all or substantially all of the materials used in the fiber pulping process described herein (including the cellulose-containing feedstock) may be sourced as waste products, resulting in minimal or no use of nonrenewable resources.

Other cellulose-dissolving agents may also be used in the cellulose pulping stage, such as iron-containing and zinc-containing reagents. In one embodiment, iron tartrate complex solvents (e.g., FeTNa) may be used as pulping reagents. FeTNa solutions may be prepared according to the procedure published by Seger et al. (B. Seger, et al., *Carbohydrate Polymers* 31 (1996) 105.) FeTNa solutions are prepared and stored while protecting them from light. The FeTNa complex may be prepared, for example, by dissolving sodium tartrate dehydrate (Alfa Assar, Cat. #16187) in deionized water, stirring and optionally heating. When the sodium tartrate dissolved, iron nitrate nonahydrate (Alfa Aesar, Cat. #12226) is added to the solution with continuous stirring. The solution is then cooled to 10-15° C. to prevent precipitation of the iron complex. 12 M sodium hydroxide solution is slowly added to the tartrate-ferric acid under controlled conditions to prevent the temperature from rising over 20° C. The solution color shifts from reddish-brown to yellowish-green, signifying the formation of the FeTNa complex. After this transition, the remaining sodium hydroxide may be added without regard to temperature. Sodium tartrate is added at the end to ensure long-term stability of the solution.

Pulping conditions using a FeTNa pulping reagent are generally basic and may be carried out at pH above 12, or above 13, or at a pH of about 14 in a closed reaction vessel. Reactions carried out using FeTNa pulping reagent at a pH of 14 in a closed reaction vessel kept at 4° C. successfully dissolved cotton feedstock. Carrying out the pulping reaction in an inert atmosphere is generally preferred, and circulating an inert gas such as argon through the pulping solution prior to and during addition of pretreated feedstock may improve dissolution rates and/or yields.

In another embodiment, zinc-containing reagents such as Zincoxen solutions may be used as cellulose pulping reagents. The active ingredients of the zincoxen solution are zinc oxide (ZnO) and EDA. Zincoxen solutions may be prepared according to the procedures published by Shenouda and Happey (S. G. Shenouda and F. Happey, *European Polymer Journal* 12 (1975) 289) or Saxena, et al. (V. P Saxena, et al., *Journal of Applied Polymer Science* 7 (1963) 181). Ethylenediamene-water solutions are chilled to 0° C. followed by stirring in zinc oxide powder. Continuous stirring for 72 hours while maintaining the temperature at 0° C. produces a suitable Zincoxen solution. Pulping conditions using a Zincoxen pulping reagent are generally basic and may be carried out at pH above 12, or above 13, or at a pH of about 14 in a closed reaction vessel.

In general, residence times of up to 4-48 hours in the pulping stage are suitable to dissolve and promote molecular separation of cellulose molecules present in the treated cellulose-containing feedstock. In some embodiments, the pulping stage takes place in a closed chamber and an inert gas, such as nitrogen or argon, is introduced in the airspace to inhibit or prevent oxidation of pulping solution constituents. Oxygen-containing gases may be substantially evacuated from the pulping stage. In some embodiments, agitation and/or mixing of the pulping mixture may be provided; in some embodiments, an inert gas, such as nitrogen or argon, may be bubbled through the pulping mixture prior to and/or during pulping.

Figure 10:
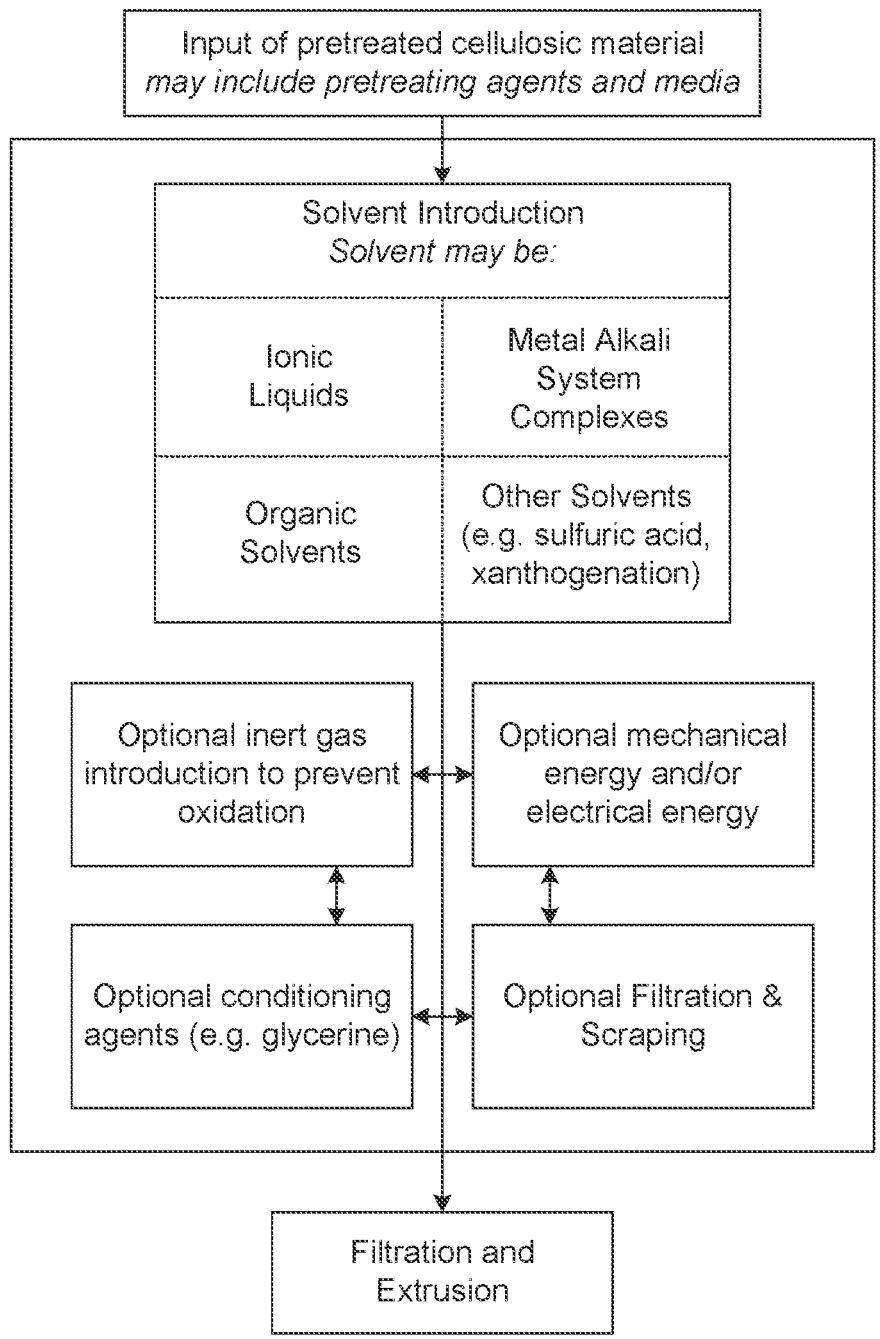
FIG. 10 illustrates an exemplary schematic flow diagram illustrating additional features of dissolving stage.
Figure 11:
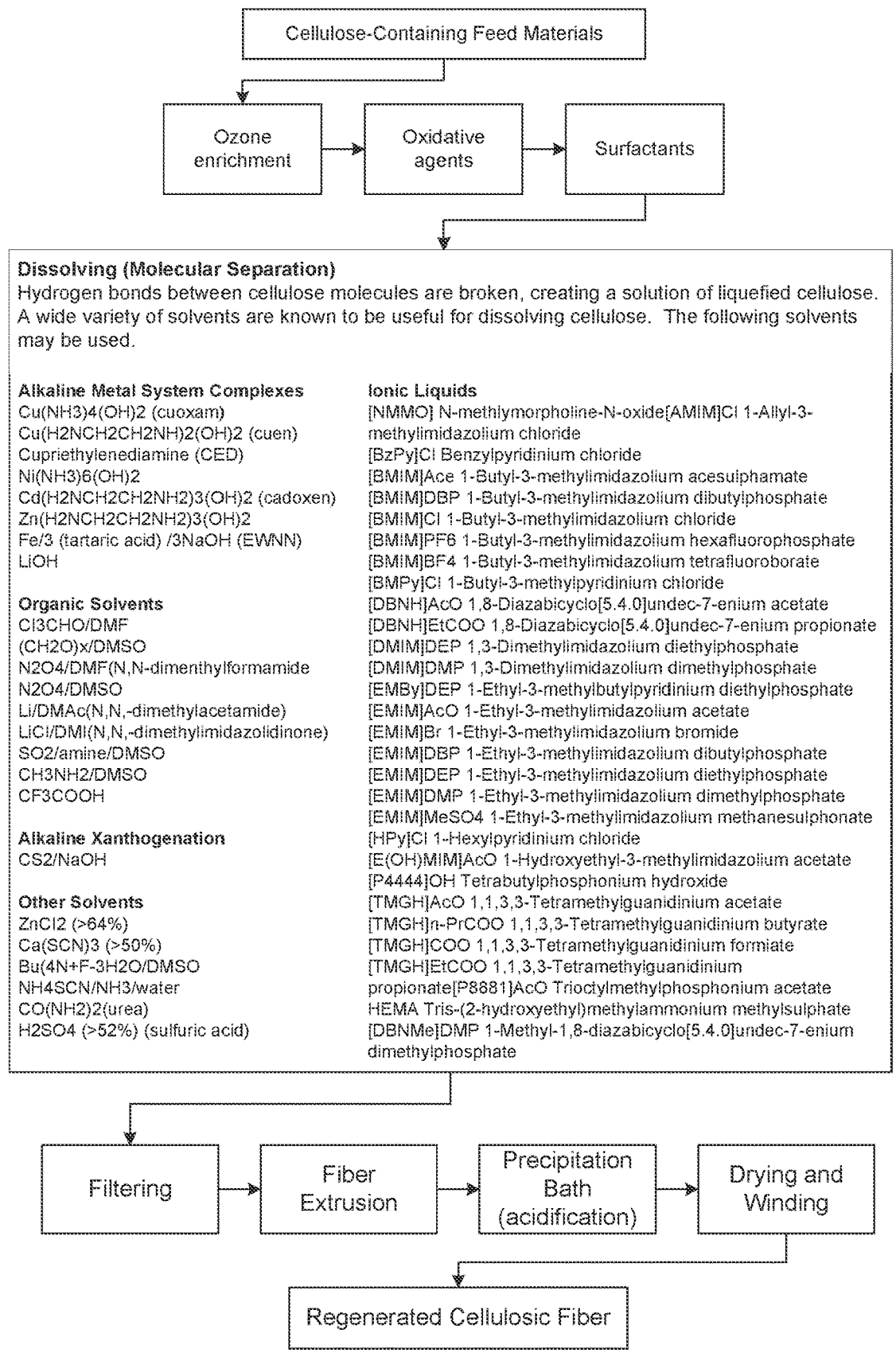
FIG. 11 illustrates an exemplary schematic flow diagram illustrating dissolving solvents and the production of regenerated cellulosic fiber.

FIG. 10 illustrates a cellulose pulping stage in which pretreated cellulosic-containing material is treated with a dissolving solvent in the pulping stage, wherein the solvent is selected from the group consisting of: ionic liquids; metal alkali system complexes; organic solvents; and other solvents, such as sulfuric acid, xanthogenation; or combinations thereof. FIG. 11 cites exemplary ionic liquids, alkaline metal system complexes, organic solvents, alkaline xanthogenation reagents, and other solvents. A list showing these potential cellulose pulping/dissolution reagents is reproduced below. The following reagents may be used in addition to or alternatively to the exemplary ionic liquids, alkaline metal system complexes, organic solvents, alkaline xanthogenation reagents and other solvents shown on the following list: 1-Ethyl-3-methylimidazolium chloride and 1-Ethyl-3-methylimidazolium ethyl sulfate. In some embodiments, the use of 1-Ethyl-3-methylimidazolium acetate is used.

Alkaline Metal System Complexes
  Cu(NH3)4(OH)2 (cuoxam)
  Cu(H2NCH2CH2NH)2(OH)2 (cuen)
  Cupriethylenediamine (CED)
  Ni(NH3)6(OH)2
  Cd(H2NCH2CH2NH2)3(OH)2 (cadoxen)
  Zn(H2NCH2CH2NH2)3 (OH)2
  Fe/3 (tartaric acid)/3NaOH (EWNN)
  LiOH
Organic Solvents
  Cl3 CHO/DMF
  (CH2O)x/DMSO
  N2O4/DMF(N,N-dimenthylformamide
  N2O4/DMSO
  Li/DMAc(N,N,-dimethylacetamide)
  LiCl/DMI(N,N,-dimethylimidazolidinone)
  SO2/amine/DMSO
  CH3NH2/DMSO
  CF3COOH
  Alkaline Xanthogenation
  CS2/NaOH
Other Solvents
  ZnCl2 (>64%)
  Ca(SCN)3 (>50%)
  Bu(4N+F-3H2O/DMSO
  NH4SCN/NH3/water
  CO(NH2)2 (urea)
  H2SO4 (>52%) (sulfuric acid)
Ionic Liquids
  [NMMO] N-methlymorpholine-N-oxide
  [AMIM]Cl 1-Allyl-3-methylimidazolium chloride
  [BzPy]Cl Benzylpyridinium chloride
  [BMIM]Ace 1-Butyl-3-methylimidazolium acesulphamate
  [BMIM]DBP 1-Butyl-3-methylimidazolium dibutylphosphate
  [BMIM]Cl 1-Butyl-3-methylimidazolium chloride
  [BMIM]PF6 1-Butyl-3-methylimidazolium hexafluorophosphate
  [BMIM]BF4 1-Butyl-3-methylimidazolium tetrafluoroborate
  [BMPy]Cl 1-Butyl-3-methylpyridinium chloride
  [DBNH]AcO 1,8-Diazabicyclo[5.4.0]undec-7-enium acetate
  [DBNH]EtCOO 1,8-Diazabicyclo[5.4.0]undec-7-enium propionate
  [DMIM]DEP 1,3-Dimethylimidazolium diethylphosphate
  [DMIM]DMP 1,3-Dimethylimidazolium dimethylphosphate
  [EMBy]DEP 1-Ethyl-3-methylbutylpyridinium diethylphosphate
  [EMIM]AcO 1-Ethyl-3-methylimidazolium acetate
  [EMIM]Br 1-Ethyl-3-methylimidazolium bromide
  [EMIM]DBP 1-Ethyl-3-methylimidazolium dibutylphosphate
  [EMIM]DEP 1-Ethyl-3-methylimidazolium diethylphosphate
  [EMIM]DMP 1-Ethyl-3-methylimidazolium dimethylphosphate
  [EMIM]MeSO4 1-Ethyl-3-methylimidazolium methanesulphonate
  [HPy]Cl 1-Hexylpyridinium chloride
  [E(OH)MIM]AcO 1-Hydroxyethyl-3-methylimidazolium acetate
  [P4444]OH Tetrabutylphosphonium hydroxide
  [TMGH]AcO 1,1,3,3-Tetramethylguanidinium acetate
  [TMGH]n-PrCOO 1,1,3,3-Tetramethylguanidinium butyrate
  [TMGH]C00 1,1,3,3-Tetramethylguanidinium formiate
  [TMGH]EtCOO 1,1,3,3-Tetramethylguanidinium propionate
  [P8881]AcO Trioctylmethylphosphonium acetate
  HEMA Tris-(2-hydroxyethyl)methylammonium methylsulphate
  [DBNMe]DMP 1-Methyl-1,8-diazabicyclo[5.4.0]undec-7-enium dimethylphosphate Any of these solvents may be used, alone or in combination, to break hydrogen bonds between cellulose molecules and produce isolated cellulose molecules.

Treatment with a cellulose dissolving solvent may be accompanied by one or more of the following: introduction of an inert gas, such as nitrogen or argon (or another noble gas); introduction of mechanical and/or electrical energy; introduction of one or more conditional agents, such as glycerine; and filtration and scraping. Filtration and extrusion may then be carried out using the isolated cellulose molecules to produce cellulose for use in various applications, including in the manufacture of regenerated cellulosic fiber. The cellulose molecules are substantially isolated and may be fully or partially dissolved to form substantially linear cellulose chains in the pulping stage, depending on the reagent used and the residence time. The pulping solution is filtered, following a suitable residence time, to remove non-cellulosic constituents with the solution and isolate substantially purified cellulose polymers, which are typically suspended in a viscous media. Filtration may involve multiple stages, including an optional centrifugation stage and one or more size exclusion filtration stages. A final filtration stage using pore sizes of 1 micron or less may be employed. The isolated, substantially purified cellulose polymers may be used in a wide range of downstream applications and, in particular applications, are used in fiber production applications to produce regenerated cellulosic fiber.

The conditions of the cellulose pulping stage and the composition of the fabric feedstock are important factors in determining whether a cotton-like fiber or rayon is produced form the pulped cellulosic materials in subsequent processing. Full dissolution of the cellulosic fibers is generally desirable for the production of rayon-like fibers, cotton-like fibers and other regenerated cellulosic fibers. Suitable solvent concentrations, reagent to feedstock ratios, residence times, and the like, may be determined using routine experimentation. While Schwiezer's Reagent and the other iron- and zinc-containing pulping reagents described above are suitable pulping solvents for many applications, it will be appreciated that other pulping reagents may be available, or may be developed, and would be suitable for use in the processes described herein.

In some embodiments, energy is introduced to the pulped solution during and/or following a desired degree of cellulose pulping. When the cellulose pulping stage is carried out in a closed reaction chamber, mechanical and/or electrical energy, such as radio frequency energy, may be introduced during or following pulping to enhance separation of different components and promote sedimentation of heavier components. If the feedstock was not pretreated to remove non-cellulosic components, suitable filtration, screening and/or size exclusion treatment may be performed, during or following pulping, to remove non-organic materials (e.g., buttons, fasteners, zippers, etc.), as well as impurities and non-cellulosic materials from the fiber pulp solution. Suitable filtration, screening and/or size exclusion treatments will depend on the types and level of contaminants remaining in the fiber pulp solution. Filtration may involve scraping the top and/or bottom of the reaction vessel to remove floating and/or sinking debris; simple size exclusion filtration; and/or gravitation separation or centrifugation to separate solids from the dissolved cellulosic materials. In some embodiments, a cascade of progressively smaller pore size filtration stages may follow preliminary separation by gravitation or centrifugation. Separated by-products may be isolated and purified (if appropriate) for re-sale or distribution to secondary markets.

In some embodiments, the cellulose pulping solution may be optionally treated with glycerin or glycerol or another agent to impart softness to the texture of the fiber.

Polyester Pulping and Isolation

Other, non-cellulosic constituents of a mixed textile feedstock may be isolated, following pretreatment, in additional pulping/dissolution stages that are carried out prior to or following pulping and dissolution of cellulosic materials. In one embodiment, schematically illustrated in FIG. 3, a blended textile feedstock comprising predominantly polyester constituents undergoes optional sorting, pretreatment and removal of non-polyester and non-polyester and non-cellulosic components. The mixed feedstock is then treated in a polyester pulping/dissolution stage to isolate (and "liquefy") polyester molecules. Pulping and isolation of polyester molecules may be accomplished by means of high temperature alkaline hydrolysis techniques in the presence of sodium hydroxide (NaOH) or other highly alkaline reagents. Phase transfer catalysts such as Benzyl Tributyl Ammonium Chloride may be introduced during polyester pulping to accelerate the reaction and improve yields. Isolated, liquefied polyester is separated and may be used in downstream processing, such as for production of regenerated polyester fibers and fabrics. Cellulosic-containing solids not dissolved during the polyester pulping stage may be treated to isolate cellulose molecules using the techniques (including pretreatment and pulping) as described herein.

Fiber Extrusion

After pulping, isolated cellulose molecules may be extruded to form regenerated fibers and textile materials. The isolated cellulose molecules are generally filtered or otherwise separated, and may be acidified and processed in a wet extrusion stage to precipitate cellulose fibers and produce cotton fibers, rayon fibers, or a mixture of cotton and rayon fibers. Various acids may be used in this precipitation stage, such as sulfuric, citric or lactic acids. In one embodiment, a sulfuric acid bath is used in combination with a wet extrusion process, wherein the viscous cellulose polymer solution is pumped through a spinneret, and the cellulose is precipitated to form fibers as it contacts the acid bath. The extrusion process and/or system may be modified and adjusted to produce fibers having different lengths, diameters, cross-sectional configurations, durability, softness, moisture wicking properties, and the like. In this process, the newly formed fibers are stretched and/or blown to produce desired configurations, washed, dried, and cut to the desired length.

Closed vat, continuous fiber extrusion techniques may be used. Closed vat systems allow recovery and/or recycling of any produced gases and by-products. Using fiber extrusion techniques is highly advantageous when applied to the regeneration of cellulosic materials to produce cotton and/or rayon fibers, since it allows a high degree of custom design and engineering of cellulosic fibers to achieve targeted comfort and performance characteristics (e.g., fiber length, diameter, cross-sectional shape, durability, softness, moisture wicking, etc.). Naturally grown fibers cannot be produced in desired or specified fiber lengths, diameters, cross-sectional profiles, or the like and cellulosic fibers regenerated using this process may therefore have different, and superior, properties compared to the natural fibers present in the initial recycled fabric feedstock.

In some embodiments, fiber extrusion may produce fibers having a denier of from about 0.1 to 70 or more denier. In some embodiments, fiber extrusion may involve extruding multifilaments having from about 20 to 300 single monofilaments, each having a denier of from about 0.1 to about 2. Extruding fine denier filaments produces woven fabric that feels softer to the touch and is desired in many embodiments. In some embodiments, fiber extrusion may additionally involve adding a false twist to the extruded filaments and texturizing them to resemble spun yarn. These treatments may obviate the necessity of using opening and spinning processes to produce yarn from the extruded fibers. Further handling of the fibers may involve cutting the continuous fiber to specific uniform lengths (stapling), missing, opening, carding, drawing, rowing, spinning, etc.

Following fiber extrusion and spinning to form yarns, fabrics, textiles and the like, waterless dyeing techniques may be used to further reduce the environmental impact of the overall process. Waterless dyeing technologies are available and typically use supercritical carbon dioxide as a solvent and carrier for dyestuff. In some embodiments, color treatment of regenerated fibers may involve determining the absorbency of the regenerated fiber and determining the color properties of fibers using spectrophotometric techniques. Color signatures and dye formulations may then be customized according to the specific properties of regenerated fibers to eliminate differences in coloration that may result from different batch qualities. In some embodiments, regenerated fibers or yarns may be surface treated (e.g., using a bleaching composition) and then dyed or overprinted using, for example, reactive, direct, pigment, sulfur and/or vat dye types and prints.

In some applications, all fiber regeneration process steps, from garment reclamation to fiber extrusion, may be located at a common geographic site (or at nearby sites). For some purposes, it may be desirable to locate different stages of the process at different physical locations. It may be desirable, in some applications, for example, to locate garment reclamation sites in populous areas, while locating other processing facilities and, in particular, the wet extrusion facility, in locations proximate textile processing facilities—e.g. near textile mills and/or garment manufacturing facilities. In some applications, garment reclamation and initial processing may take place at one location and cellulosic pulp may then be shipped or transported to a different location for wet extrusion and other downstream processing (e.g., dying, garment manufacturing, etc.)

Regenerated cellulosic fibers (e.g., cotton and/or rayon) produced as described above may be twisted into thread, dyed, bleached, woven into textiles and, ultimately, cut and sewn into garments.

In another aspect, fiber pulping of low grade cotton fibers, harvested naturally or produced from a raw material fabric feedstock as described above, is provided. In this process, low grade natural cotton fibers (e.g., low staple length cotton fibers) may be pulped as described herein, and then acidified and subjected to a wet extrusion process to produce newly formed fibers which may be stretched and/or blown to a desired diameter, cross-sectional profile or the like, washed, dried, and cut to a desired length. In this fashion, low grade (natural and/or recycled) cotton fibers may be regenerated and converted to newly formed, higher value fibers having more desirable properties than those of the original natural and/or recycled cotton fibers.

Although the process has been described primarily with reference to using cotton garments and feedstock containing cotton materials, it will be appreciated that other types of fabrics may be pulped and regenerated using the same or similar processes to produce regenerated fibers. It will also be appreciated that additional process steps may be employed, as is known in the art, and that equivalent treatment steps may be substituted for those described above.

EXAMPLES

Example I

A small scale experiment was conducted to establish feasibility of cellulose pulping and fiber regeneration using shredded cotton garment material as a feedstock. The shredded feedstock material was treated with Schweizer's Reagent to form a dissolved pulping solution, and the pulp solution was acidified by treatment with sulfuric acid. Fibers were regenerated as a result of the acidification.
Chemical Reactions
1. $2NaOH(aq) + CuSO_4(aq) \rightarrow Cu(OH)_2(s) + Na_2SO_4(aq)$
2. $Cu(OH)_2(aq) \rightarrow Cu^{2+}(aq) + 2OH^-(aq)$
3. $nCu^{2+}(aq) + (cellulose)_n + 2nOH^- \rightarrow (CuC_6H_8O_5)_n + 2nH_2O$
4. Cellulose is actually dissolved in $[Cu(NH_3)_4](OH)_2$ solution and then regenerated as cotton or rayon when extruded into sulfuric acid.
5. Note: Filtration of $Cu(OH)2$ can be a problem; small amounts of precipitate should be filtered and then combined in one container.

Process Instructions
1. Dissolve 25.0 g of $CuSO_4.5H_2O$ in 100 mL distilled water. Heat the water to accelerate the dissolving process.
2. Dissolve 8.0 grams NaOH in 200 mL distilled water.
3. Mix the cooled NaOH solution with the copper sulfate solution. Collect the resultant gelatinous precipitate of $Cu(OH)_2$ by filtration. Wash the precipitate with three 10-mL portions of distilled water. If using 11.0 cm filter paper, several filtrations will be required because of the large amount of precipitate produced.
4. Measure 70 ml concentrated $NH_3(aq)$ into a 250-mL Erlenmeyer flask. Shred 10-15 grams cotton garment. Add the $Cu(OH)_2$ precipitate carefully along with the filter paper to this flask and stir. This should result in a deep purplish-blue solution of tetraaminecopper(II) hydroxide, referred to as Schweizer's reagent. Stopper the flask and stir periodically for 24 hours or more. Use a magnetic stirrer, if available. One may dip the flask in warm water to speed the process.
5. Take up the contents of the 250-mL Erlenmeyer flask in 10-mL increments in a 10-mL or 50-mL syringe. Squeeze out the contents into a 1000-mL beaker containing 300 mL of 1.6 M sulfuric acid. Be sure that the tip of the syringe or pipet is under the surface of the acid. Crude "thread" forms.
6. The clumps or threads can be washed free of the solution to show the blue-cast white color of the regenerated fibers. Subsequent analysis will demonstrate whether the regenerated fibers have the structure of cotton or rayon.

In alternative schemes, chemical reaction (1), noted above, may be omitted when using copper hydroxide and ammonia reactants to form Schweitzer's reagent as follows: $Cu(OH)_2 + 4NH_3 + 2H_2O \rightarrow [Cu(NH_3)_4(H_2O)_2]^{2+} + 2OH^-$. This alternative chemistry does not require filtration (step 5, above) and produces no by-products that require disposal or removal.

Example II

Analyses were conducted to compare regenerated cellulosic fibers, processed as described herein, with virgin cotton fibers. Regenerated cellulosic fiber produced as described above was tested using the ASTM D 2256-02 test method for tensile properties of yarns by single-strand method. The regenerated cellulosic fibers exhibited uniform-diameter fiber properties, with the tenacity of cotton and the fineness of silk. Tenacity is a measure of the breaking strength of a fiber divided by the denier. The comparative fiber properties of the regenerated cellulosic fiber produced as described above and the premium long-staple cotton fiber, as reported in the above-mentioned literature reference, are outlined below.

The tenacity tests indicate that regenerated cellulosic fiber produced as described above has similar strength to the tested cotton, for its diameter. Extrusion allows the diameter (and hence absolute strength of individual fibers) to be tightly controlled.

What is claimed is:

1. A method for treating a poly-cotton blended textile feedstock consisting of a first, cotton cellulosic component and a second, polyester non-cellulosic component, the method comprising:
   treating the blended textile feedstock with a first reagent to dissolve the first, cotton cellulosic component;
   retrieving the dissolved first, cotton cellulosic component;
   treating the blended textile feedstock with a second reagent to dissolve the second, polyester non-cellulosic component;
   retrieving the dissolved second, polyester non-cellulosic component;
   producing a first set of regenerated, isolated cotton fibers from the dissolved first, cotton cellulosic component; and
   producing a second set of regenerated, isolated polyester fibers from the dissolved second, polyester non-cellulosic component.

2. The method of claim 1, wherein the second reagent is a phase transfer catalyst.

3. The method of claim 2, wherein the phase transfer catalyst is benzyl tributyl ammonium chloride.

4. The method of claim 1, wherein the first reagent is a cellulosic dissolving agent.

5. The method of claim 4, wherein the cellulose dissolving agent is Schweitzer's Reagent, iron tartrate complex, or zincoxen.

6. The method of claim 1, further comprising extruding the dissolved first component or the dissolved second component to produce the first set or the second set of the regenerated fibers.

7. The method of claim 1, further comprising subjecting the blended textile feedstock to a pretreatment stage to produce pretreated solids, the subjecting being performed before any treating.

8. The method of claim 7, wherein the pretreatment stage includes aqueous washing at a temperature above 100° C. and pressure in excess of 100 kPa; supercritical $CO_2$ washing; or amorphous phase aqueous treatment.

9. The method of claim 7, wherein the pretreatment stage includes treatment with aqueous solution at a temperature in excess of 320° C. at a pressure in excess of 2.5 MPa in a closed reaction vessel.

10. The method of claim 7, wherein the pretreatment stage includes treatment with an oxidative agent, a reducing agent, or an oxidative agent and a reducing agent.

11. The method of claim 7, wherein the pretreatment stage includes treatment with an organic solvent.

12. The method of claim 7, wherein the pretreatment stage includes treatment with an enzyme.

13. The method of claim 7, wherein the pretreatment stage includes treatment with a swelling agent.

14. The method of claim 1, wherein treating the blended textile feedstock with the first reagent to dissolve the first, cotton cellulosic component is performed before treating the poly-cotton blended textile feedstock with the second reagent to dissolve the second, polyester non-cellulosic component.

15. The method of claim 1, wherein treating the poly-cotton blended textile feedstock with the second reagent to dissolve the second, polyester non-cellulosic component is performed before treating the poly-cotton blended textile feedstock with the first reagent to dissolve the first, cotton cellulosic component.

16. The method of claim 1, wherein producing the first set of regenerated fibers is performed via repolymerization.

17. The method of claim 1, wherein producing the second set of regenerated fibers is performed via repolymerization.

* * * * *